(12) United States Patent
Liu et al.

(10) Patent No.: US 10,432,574 B2
(45) Date of Patent: *Oct. 1, 2019

(54) MANAGING FOR-SALE GROUP POSTINGS

(71) Applicant: Facebook, Inc., Menlo Park, CA (US)

(72) Inventors: Deborah Liu, Palo Alto, CA (US);
Mary Pao-an Ku, San Jose, CA (US);
Bowen Pan, Palo Alto, CA (US);
Derek Cheng, Issaquah, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/843,797

(22) Filed: Dec. 15, 2017

(65) Prior Publication Data

US 2018/0109486 A1    Apr. 19, 2018

Related U.S. Application Data

(63) Continuation of application No. 14/707,985, filed on May 8, 2015, now Pat. No. 9,860,205.

(51) Int. Cl.
| | |
|---|---|
| *G06Q 30/06* | (2012.01) |
| *H04L 12/58* | (2006.01) |
| *H04L 29/08* | (2006.01) |
| *G06Q 50/00* | (2012.01) |

(52) U.S. Cl.
CPC ......... *H04L 51/32* (2013.01); *G06Q 30/0605* (2013.01); *G06Q 30/0631* (2013.01); *G06Q 30/0641* (2013.01); *G06Q 50/01* (2013.01); *H04L 51/14* (2013.01); *H04L 51/16* (2013.01); *H04L 67/306* (2013.01)

(58) Field of Classification Search
CPC ........... G06Q 30/0613; G06Q 30/0601; G06Q 30/0282; G06Q 30/0214; G06Q 30/0605; G06Q 30/0641; G06Q 30/0631; G06Q 10/06398; G06Q 10/02; G06Q 50/01; G06F 17/30684; H04L 51/32; H04L 67/306

See application file for complete search history.

(56) References Cited

U.S. PATENT DOCUMENTS

| | | | |
|---|---|---|---|
| 9,860,205 B2 * | 1/2018 | Liu .................... H04L 51/32 |
| 2010/0042511 A1 * | 2/2010 | Sundaresan ............ G06Q 10/10 705/26.1 |
| 2013/0226723 A1 * | 8/2013 | Chapman ........... G06Q 30/0601 705/26.2 |
| 2015/0088650 A1 * | 3/2015 | Taylor ............... G06F 17/30684 705/14.54 |

(Continued)

OTHER PUBLICATIONS

U.S. Appl. No. 14/707,985, Apr. 21, 2017, Office Action.
U.S. Appl. No. 14/707,985, Aug. 24, 2017, Notice of Allowance.

*Primary Examiner* — Le H Luu
(74) *Attorney, Agent, or Firm* — Keller Jolley Preece

(57) ABSTRACT

The present disclosure is directed toward systems and method for managing social networking system for-sale groups. For example, systems and method described herein identify sale listings within social networking system for-sale groups and aggregates the identified sale listings into a personal town square for a particular social networking system user. Furthermore, systems and methods can reorder the personal town square based on likes and interests of the social networking system user.

20 Claims, 9 Drawing Sheets

(56) References Cited

U.S. PATENT DOCUMENTS

| | | | |
|---|---|---|---|
| 2015/0242875 A1* | 8/2015 | Stachowski | G06Q 30/0214 705/14.16 |
| 2016/0026961 A1* | 1/2016 | Chang | G06Q 10/06398 705/7.39 |
| 2016/0155181 A1* | 6/2016 | Romaya | G06Q 30/0282 705/26.63 |
| 2016/0196508 A1* | 7/2016 | Richter | G06Q 10/02 705/5 |
| 2016/0307249 A1* | 10/2016 | Ku | G06Q 30/0613 |
| 2016/0314519 A1* | 10/2016 | Liu | G06Q 30/0641 |

* cited by examiner

MANAGING FOR-SALE GROUP POSTINGS

CROSS REFERENCE TO RELATED APPLICATIONS

The present application is a continuation of U.S. application Ser. No. 14/707,985 filed May 8, 2015. The aforementioned application is hereby incorporated by reference in its entirety.

BACKGROUND

1. Technical Field

One or more embodiments of the present invention relate generally to commerce within a social networking system. More specifically, one or more embodiments of the present invention relate to managing social networking system for-sale groups.

2. Background and Relevant Art

While commercial settings are commonly utilized for the purchase of goods, people also buy and sell goods in non-commercial settings. For example, garage sales, yard sales, and estate sales provide a setting where individuals can negotiate the sale and purchase of a wide range goods. These informal, non-commercial settings embody the notion that "one man's trash is another man's treasure," and provide individuals with ways to sell things they no longer want, or purchase things they need for less than they would typically spend in a commercial setting.

It is not surprising that the garage sale format of buying and selling goods has transitioned online via social networking system "for-sale" groups. A social networking system generally allows for the formation of forum-like groups dedicated to a singular purpose. Social networking system users can join a social networking system group to participate in discussions, ask questions, post articles, etc. A social networking system for-sale group typically functions like a neighborhood garage sale and allows users to submit sale listings that advertise goods they would like to sell. Users can view all the posts and listings included in a for-sale group and utilize features of the social networking system to comment on a particular listing or send a message to the seller associated with the particular listing in order to negotiate a price, make a purchase, or arrange for a pick up.

After a user joins multiple for-sale groups, a problem generally arise for that user when the user wants to scan sale listings included in each for-sale group. For example, in order to view sale listings for all of the for-sale groups that the user has joined, the user generally must navigate to a social networking system web page for each for-sale group. Furthermore, once the user lands on each for-sale group web page within the social networking system, the user must typically scroll through multiple sale listings that are of no interest to the user before viewing a sale listing that the user finds interesting. The process of visiting multiple web pages in succession and scrolling through sale listings of no interest wastes time and is inefficient.

In some cases, in response to a user joining a for-sale group, the social networking system can add the sale listings from the joined for-sale group to the user's personal newsfeed. For example, a social networking system typically provides a personal newsfeed for each user where the user can see social networking system posts from other social networking system users with whom the user is associated. When the social networking system adds sale listings from a for-sale group to the user's personal newsfeed, however, the user still faces problems similar to those enumerated above. For instance, social networking system generally intersperses the sale listings among the other social networking system posts within the user's personal newsfeed such that the user's personal newsfeed is chronologically ordered. Thus, the user still has to scroll through a large amount of material in order to view sale listings that are of interest to the user. This too wastes the user's time and is very inefficient.

Thus, there are several disadvantages to current methods for managing for-sale groups within a social networking system.

SUMMARY

One or more embodiments described herein provide benefits and/or solve one or more of the foregoing or other problems in the art with systems and methods for managing social networking system for-sale groups. One or more embodiments described herein include systems and methods for managing social networking system for-sale groups by aggregating sale listings corresponding with a user's for-sale group memberships into a personal town square. For example, in one embodiment, systems and methods described herein create a single web page, or town square, including sale listings from each for-sale group where the user is a member. Accordingly, the user can visit the personal town square rather than visiting each individual for-sale group. Furthermore, systems and methods described herein also organize the user's town square such that sale listings that are likely to be of interest to the user are prominently displayed.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments of the invention will be described and explained with additional specificity and detail through the use of the accompanying drawings in which.

DETAILED DESCRIPTION

Figure 1:
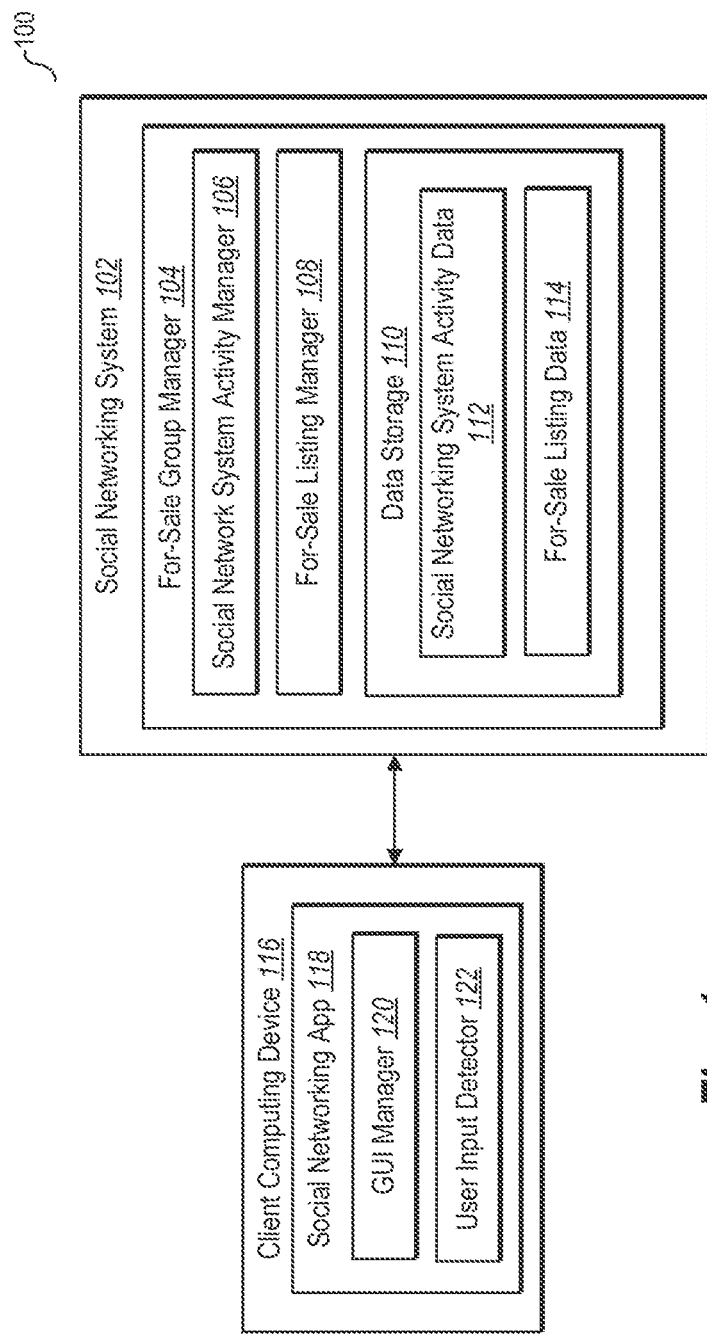
FIG. 1 illustrates a detailed schematic diagram of a for-sale group system in accordance with one or more embodiments.

One or more embodiments described herein provide benefits and/or solve one or more of the foregoing or other problems in the art with systems and methods for managing social networking system for-sale groups. For example, a for-sale group system of one or more embodiments described herein manages and organizes for-sale group's memberships and contents. In one or more embodiments, the for-sale group system can identify all for-sale groups in which a particular social networking system user is a member, and build a personal town square web page or feed for that particular user including sale listings from all the user's for-sale groups.

Furthermore, in at least one embodiment, the for-sale group system can organize a user's personal town square web page such that sale listings that are likely of interest to the user are emphasized. For example, the for-sale group system can analyze a user's social networking activities in order to determine the user's likes and interests. The for-sale group system can then organize a user's personal town square web page based on the determined likes and interests such that sale listings that are likely of interest to the user are emphasized over other sale listings.

For example, the for-sale group system can identify a social networking system user's for-sale group memberships, as well as other social networking system activity associated with the user. In one or more embodiments, the for-sale group system can analyze the contents of each for-sale group where the user is a member in order to identify the sale listings included in each for-sale group and aggregate the identified sale listings into a personalized web page for the user. Additionally or alternatively, the for-sale group system can build a personalized web page of sale listings for the user even if the user is not a member of any for-sale groups. For example, the for-sale group system can analyze social networking system activity associated with the user to identify sale listings across all for-sale groups hosted by the social networking system that the user will likely find interesting.

Furthermore, the for-sale group system can utilize the social networking system activity associated with the user to organize and reorder the user's personalized web page of sale listings. For example, after multiple sale listings are aggregated into a personalized web page, the user will likely be most interested in only a small number of the aggregated sale listings. Accordingly, the for-sale group system can determine the user's likes and interests based on the social networking system activity associated with the user. In response to determining the user's likes and interests, the for-sale group system can identify sale listings within the user's personalized web page of sale listings and prominently position those identified sale listings such that they can be quickly and easily seen by the user.

As used herein, the term "social networking system" refers to a system that supports and enables on-line communication, input, interaction, content-sharing, and collaboration between users. A user of the social networking system can have one or more "friends" via the social networking system. As used herein, the term "friend" refers to a co-user associated with a user via the social networking system (i.e., a contact or connection). Furthermore, as used herein, a "for-sale group" is a group within the social networking system where users (who may or may not be friends) can submit standard social network system posts, as well as sale listings that advertise items that are for sale. By utilizing the functionality of the social networking system (i.e., via comments, messages, "likes," etc.), purchasers and sellers can coordinate the purchase and sale of items through for-sale groups. For-sale groups may or may not require participants to become group members before viewing and/or submitting sale listings.

In one or more embodiments, a user may send one or more social media posts via the social networking system. As used herein, a "post" refers to an electronic communication sent from one user to one or more co-users associated with the user via the social networking system. In one embodiment, a post is an electronic communication from a user that the social networking system posts to a newsfeed (i.e., a "wall") associated with every friend of the user. Additionally or alternatively, a post can be an electronic communication from a user that the social networking system posts to a newsfeed associated with a particular for-sale group or community of social networking system users.

In one or more embodiments, a user may send one or more electronic messages via the social networking system. As used herein, a "message" refers to an electronic communication sent from one user via the social networking system. In one or more embodiments, a message is a private message between only a sender and one recipient. Rather than posting a message to a newsfeed, as described above, the social networking system can deliver the message to a private inbox associated with the recipient. Additionally or alternatively, a message can be a private message between only a sender and a group of recipients. In that case, the social networking system can deliver a copy of the private message to an inbox associated with each member of the group of recipients. Other examples of messages include text messages, instant messages, or any other electronic message.

While a social networking system is predominantly concerned with enabling social networking system communication between users, in one or more embodiments as mentioned above, the social networking system can also enable commercial transactions. For example, in one embodiment, a social networking system can support for-sale groups or communities of users who are interested in the purchase and/or sale of various types of goods. For instance, a social networking system for-sale group may be dedicated to the purchase and sale of classic car parts. By utilizing various features of the social networking system, the members of the classic car parts group can communicate with each other about parts for sale, prices, locations, etc., and eventually arrange for the sale and purchase of the parts. In one embodiment, the social networking system can include payment features that allow for a group member to fund the transaction and complete the sale via the for-sale group.

In one or more embodiments described herein, a product seller may utilize the social networking system to facilitate the advertising and sale of the product. For example, in one embodiment, the seller can compose a social media post that advertises the product for sale (or simply a "sale listing"). As used herein, a "sale listing" within a for-sale group refers to social networking system post composed by an item seller that advertises the item for sale. The seller can include information related to the product in the social media post, which, when the seller submits the sale listing to the social networking system, then becomes part of the structured data associated with the sale listing.

As used herein, "structured data" can include any data that is structured into specific groups, fields, or categories and/or associated with particular aspects of a post, a person, or a product being sold. Structured data can include metadata associated with node and edge information related to the social media post, information related to the seller, information related to the product, and interaction information related to the sale listing within the social networking system. To illustrate, structured data for a sale listing may include a price, a product title/name, a product description, a product location, a product model name/number, a product model year, product specifications, inventory available, or any other specific types of information/data associated with a product being sold. The structured data may also include various media content, such as images (e.g., pictures of a product), video, audio, etc. Using this structured data, the social networking system can facilitate the insertion of "rich" objects within a messaging thread or elsewhere, such rich objects providing more information and/or content than typical textual messages.

FIG. 1 illustrates a schematic diagram illustrating an example embodiment of a for-sale group system 100 (or simply "system 100"). As shown in FIG. 1, the system 100 may include various components for performing the processes and features described herein. For example, as shown in FIG. 1, the system 100 may include, but is not limited to, a social networking system 102, a for-sale group manager 104, and one or more client computing device(s) 116. The for-sale group manager 104 can include, but is not limited to, a social networking system activity manager 106, a for-sale listing manager 108, and data storage 110, which includes social networking system activity data 112 and for-sale listing data 114. The client computing device 116 can include a social networking application 118, which includes a graphical user interface manager 120 and an input detector 122.

The social networking system 102, each of the components 106-114 of the for-sale group manager 104, and each of the components 120-122 of the social networking application 118 can be implemented using a computing device including at least one processor executing instructions that cause the system 100 to perform the processes described herein. In some embodiments, the components 102-122 can all be implemented by a single server device, or across multiple server devices. Additionally or alternatively, a combination of one or more server devices and one or more client devices can implement the components 102-122. Furthermore, in one embodiment, the components 102-122 can comprise hardware, such as a special-purpose processing device to perform a certain function. Additionally or alternatively, the components 102-122 can comprise a combination of computer-executable instructions and hardware.

In one or more embodiments, the social networking application 118 can be a native application installed on the client computing device 116. For example, the social networking application 118 may be a mobile application that installs and runs on a mobile device, such as a smart phone or a tablet. Alternatively, the social networking application 118 can be a desktop application, widget, or other form of a native computer program. Alternatively, the social networking application 118 may be a remote application accessed by the client computing device 116. For example, the social networking application 118 may be a web application that is executed within a web browser of the client computing device 116.

As mentioned above, and as shown in FIG. 1, the social networking application 118 can include a graphical user interface (or simply "GUI") manager 120. The GUI manager 120 can provide, manager, and/or control a graphical user interface (or simply "user interface") that allows a user to compose, view, and submit for-sale group listings, as well as other social networking system posts and messages. For example, the GUI manager 120 can provide a user interface that facilitates the display of a for-sale group containing one or more item listings. Likewise, the GUI manager 120 can provide a user interface that facilitates the display of a social network system user's newsfeed or wall. Similarly, the GUI manager 120 can provide a user interface that displays one or more electronic messages received by a social network system user.

More specifically, the GUI manager 120 can facilitate the display of a user interface (e.g., by way of a display device associated with the client computing device 116). For example, the GUI manager 120 may compose the user interface of a plurality of graphical components, objects, and/or elements that allow a user to compose, send, and receive electronic messages, social networking system posts, and/or for-sale group listings. More particularly, the GUI manager 120 may direct the client computing device 116 to display a group of graphical components, objects, and/or elements that enable a user to view electronic messages, social networking system posts, and/or for-sale group listings.

In addition, the GUI manager 120 may direct the client computing device 116 to display one or more graphical objects, controls, or elements that facilitate user input for composing, sending, and/or submitting a social networking system post, electronic message, and/or for-sale group listing. To illustrate, the GUI manager 120 may provide a user interface that allows a user to provide user input to the social networking application 118. For example, the GUI manager 120 can provide one or more user interfaces that allow a user to input one or more types of content into a social networking system post, an electronic message, or a for-sale group listing. As used herein, "content" refers to any data or information to be included as part of a social networking system post, message, or listing. For example, the term "content" will be used herein to generally describe text, images, digital media, files, location information, payment information, or any other data that can be included as part of a social networking system post, electronic message, or for-sale group listing.

The GUI manager 120 can also facilitate the input of text or other data to be included in a social networking system post, electronic message, or for-sale group listing. For example, the GUI manager 120 can provide a user interface that includes a touch display keyboard. A user can interact with the touch display keyboard using one or more touch gestures to input text to be included in a social networking system post, electronic message, or for-sale group listing. For example, a user can use the touch display keyboard to enter a description of an item in a for-sale group listing. In addition to text, the user interface, including the touch display keyboard, can facilitate the input of various other characters, symbols, icons, or other information.

Furthermore, the GUI manager 120 can provide and transition between two or more graphical user interfaces. For example, in one embodiment, the GUI manager 120 can provide a newsfeed to a social networking system user containing one or more social networking system posts from co-users associated with the user via the social networking system. Later, in response to detected input from the user or the for-sale group manager 104, the GUI manager 120 can transition to a second graphical user interface that includes the listings within a particular for-sale group.

As further illustrated in FIG. 1, the social networking application 118 can include a user input detector 122. In one or more embodiments, the user input detector 122 can detect, receive, and/or facilitate user input in any suitable manner. In some examples, the user input detector 122 can detect one or more user interactions with respect to the user interface. As referred to herein, a "user interaction" means a single interaction, or combination of interactions, received from a user by way of one or more input devices.

For example, user input detector 122 can detect a user interaction from a keyboard, mouse, touch page, touch screen, and/or any other input device. In the event the client computing device 116 includes a touch screen, the user input detector 122 can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The user input detector 122 may additionally, or alternatively, receive data representative of a user interaction. For example, user input detector 122 may receive one or more user configurable parameters from a user, one or more user commands from the user, and/or any other suitable user input. The user input detector 122 may receive input data from one or more components of the social networking system 102, or from one or more remote locations.

The social networking application 118 can perform one or more functions in response to the user input detector 122 detecting user input and/or receiving other data. Generally, a user can control, navigate within, and otherwise use the social networking application 112 by providing one or more user inputs that the user input detector 122 can detect. For example, in response to the user input detector 122 detecting user input, one or more components of the social networking application 118 allow a user to select a recipient for a message, compose a message, select content to include in a message, and/or send a message to the recipient. Additionally, in response to the user input detector 122 detecting user input, one or more components of the social networking application 118 allow a user to navigate through one or more user interfaces to review received electronic messages, for-sale postings, etc.

As illustrated in FIG. 1, the for-sale group system 100 can include the social networking system 102. The social networking system 102 can also provide social networking system posts (whether text or otherwise) to a social networking graphical user interface (e.g., a profile, a newsfeed, or "wall") of one or more users of the social networking system 102. For example, one or more embodiments may present a user with a social networking system newsfeed and electronic messages from one or more co-users associated with the user via the social networking system 102. In one or more embodiments, the user may scroll through the social networking system newsfeed in order to view recent social networking system posts submitted by the one or more co-users associated with the user via the social networking system 102. In one embodiment, the social networking system 102 may organize the social networking system posts chronologically in a user's social networking system newsfeed. In alternative embodiments, the social networking system 102 may organize the social networking system posts geographically, by interest groups, according to a relationship coefficient between the user and the co-user, etc. Additionally, in one or more embodiments, the user may download a copy of the social networking system newsfeed as a record of the social networking system posts displayed thereon.

Additionally, in one embodiment, the social networking system 102 can transmit social networking system posts and/or electronic messages between users. For example, in response to a user submitting a social networking system post to the social networking system 102, the social networking system 102 can update the social networking system newsfeeds of the co-users who are "friends" with the user. Furthermore, in one embodiment, the social networking system 102 can transmit an electronic message between just two users. In that case, the social networking system 102 does not add the electronic message to the social networking newsfeed to a plurality of co-users, but rather provides the electronic message within a social networking graphical user interface (e.g., an inbox) of one or more message recipients. In other words, an electronic message can be a private message between two users of the social networking system 102, and a social networking system post may be a semi-public message that the social networking system 102 adds to the social networking system newsfeeds of a plurality of co-users of the social networking system 102.

As mentioned above, and as illustrated in FIG. 1, the social networking system 102 can further include the for-sale group manager 104, which can manage all activities in connection with one or more for-sale groups. The for-sale group manager 104 can include a social networking system activity manager 106, which in turn can communicate with the social networking system 102 to receive various types of information. In one or more embodiments, the social networking system activity manager 106 can receive information related to social networking system users, as well as information related to for-sale groups and the sale listings therein.

For example, the social networking system activity manager 106 can receive information related to a social networking system user including demographic information for the user. In one or more embodiments, a user's demographic information can include, but is not limited to, the user's education, location, hometown, birthday, employment, salary, family and romantic relationships, and so forth. Additionally, a user's demographic information can be related to the user's personal interests (e.g., favorite books, movies, restaurants, etc.). The social networking system activity manager 106 can identify this information through an analysis of the user's social networking system profile, account information, or via other social networking system activities in which the user engages.

Furthermore, the social networking system activity manager 106 can receive information related to social networking system relationships between users. For example, a social networking system user may be "friends" with one or more additional users. Thus, in one or more embodiments, the user can view social media posts submitted by friends, comment on friends' social media posts, reply to messages sent by friends, add tags to photographs and videos submitted by friends, view location check-ins of friends, etc. The social networking system activity manager 106 can identify information related to any of these user-to-user interactions.

Additionally, the social networking system activity manager 106 can receive information related to specific activities in which a social networking system user engages. For example, through the social networking system, a social networking system user can submit posts, send private messages, comment on other user's posts and media, tag posts and media, "like" other user's posts and comments, submit sale listings, and share the posts and/or sale listings of other users. In one or more embodiments, the social networking system activity manager 106 can identify the content of any of these types of interactions, as well as structured data associated with the post, message, comment, sale listing, etc.

The social networking system activity manager 106 can also receive information related to other activities in which a user engages such as media uploads, user tags, and check-ins. For example, in one or more embodiments, a user can upload various media (e.g., digital photographs, digital videos, audio files, etc.) to the social networking system for inclusion in posts, messages, archives, etc. Additionally, in one or more embodiments, the user can tag other users in connection with uploaded media and/or posts, sale listings, etc. As used herein, tagging a user simply means that the social networking system creates a record that the tagged user is associated (e.g., as being present, at the same location, etc.) with the media and/or post in which the tagged user is tagged. Furthermore, in one or more embodiments, the user can check-in at various locations, as a way of informing friends of the user's presence at a given location. The social networking system activity manager 106 can identify information related to any of these activities.

Furthermore, the social networking system activity manager 106 can receive information related to various web page interactions that a user makes in connection with the social networking system 102. For example, as described above, the social networking system 102 can present a range of content via one or more web pages. Accordingly, the social networking system activity manager 106 can receive information related to a social networking system user's clicks (e.g., clicks on various hyperlinks or other controls), the social networking system user's views (e.g., of web pages, media, or other web content), and the social networking system user's scrolls (e.g., how quickly the user scrolls through content, scroll positions associated with where the user pauses in a web page).

As mentioned above, the social networking system activity manager 106 can also receive information related to for-sale groups and the sale listings therein. For example, the social networking system activity manager 106 can receive information associated with the membership of a for-sale group. In one or more embodiments, in order for a social networking system user to view and/or submit sale listings to a particular for-sale group hosted by the social networking system, the user must first be a member of the for-sale group. Generally, a user may be a member of multiple for-sale groups. Accordingly, the social networking system activity manager 106 can receive information detailing the membership records of any for-sale group hosted by the social networking system 102.

In addition to information about a for-sale group's member records, the social networking system activity manager 106 can receive additional information specific to a for-sale group. For example, the social networking system activity manager 106 can receive information associated with all the posts and listings included in a particular for-sale group. As described above, a post is an electronic communication from a user that the social networking system 102 can post to a newsfeed. Also as described above, a user submits a sale listing to advertise an item for sale.

In one or more embodiments, a for-sale group may include both posts and sale listings. Accordingly the social networking system activity manager 106 can receive information associated with both the posts and the sale listings included in a for-sale group. Information associated with posts and sale listings can include, but is not limited, to the content of a post or sale listing, social networking system activity associated with a post or sale listing, and structured data associated with a post or sale listing. In one or more embodiments, the content of a post or sale listing can include text, and/or media (e.g., digital photographs, digital video, etc.). Additionally, in one or more embodiments, social networking system activity associated with a post or sale listing can include comments associated with the post or sale listing, messages associated with the post or sale listing, "likes" associated with a post or sale listing, "shares" of the post or sale listing, tags associated with the post or sale listing, check-ins associated with the post or sale listing, views associated with the post or sale listing, clicks associated with the post or sale listing, scrolls associated with the post or sale listing, etc. Furthermore, structured data associated with a post or sale listing can include information associated with the social networking system user who submitted the post or sale listing, information detailing the date and time the social networking system user submitted the post or sale listing, information associated with social networking system users who engaged in social networking activity associated with the post or sale listing, or any other type of structured data.

The social networking system activity manager 104 can also receive descriptive information associated with a for-sale group. For example, the social networking system activity manager 104 can receive information that describes the for-sale group (e.g., the stated purpose of the for-sale group, types of items typically sold via the for-sale group, etc.), information related to the amount of web traffic the for-sale group experiences, information related to an average amount of time a sale listing is active via the for-sale group, etc.

As mentioned above, and as illustrated in FIG. 1, the for-sale group manager 104 can also include a for-sale listing manager 108. Also as mentioned above, the social networking system 102 can host for-sale groups where social networking system users buy and sell goods in a non-commercial setting. Accordingly, the for-sale listing manager 108 can receive, organize, analyze, and display sale listings related to each for-sale group hosted by the social networking system 102. As mentioned above, a "sale listing" refers to a user-to-user social networking system post submitted by a for-sale group member that advertises a particular item that the user hopes to sell and/or purchase. In one or more embodiments, a user-to-user sale listing is different from a standard social networking system post in several ways. For example, the social networking system generally adds a post from a user to the newsfeeds of friends associated with the user, while the social networking system typically adds a sale listing only to the newsfeed associated with the for-sale group where the sale listing was submitted. Additionally, social networking system posts are generally opinion or news based, while sale listings generally only advertise items available for sale or purchase.

As used herein, a user-to-user social networking system post generally does not include any posts, sale listings, or advertisements submitted by a commercial retailer. For example, a user-to-user social networking system post does not include a post, sale listing, or advertisement that appears in any newsfeed or group in response to the social networking system receiving payment. Furthermore, a user-to-user social networking system post does not include a post, sale listing, or advertisement that is submitted to the social networking system by any entity that identifies itself as a commercial retailer.

Despite the differences between posts and sale listings, in at least one embodiment, the social networking system 102 has no mechanism by which a user submitting a sale listing can specifically indicate that the submission is a indeed a sale listing. In other words, the social networking system 102 may not readily be able to tell the difference between a submission that is meant to be a post and a submission that is meant to be a sale listing. For this reason, in one or more embodiments, the for-sale listing manager 108 can analyze information associated with a submission to determine whether the submission is a post or a sale listing.

In some cases, sale listings are found within groups that are dedicated to buying and selling (i.e., for-sale groups). In other cases, however, sale listings can be found anywhere in the social networking system. For example, in one case, a user may submit a post that appears on the personal newsfeeds of the user's social networking system friends that advertises an item the user wants to sell. In that case, the post is actually a sale listing, even though the user did not submit it to a for-sale group. In any embodiment, the for-sale listing manager 108 can determine whether a post submission is actually a sale listing, regardless of where the post is submitted within the social networking system.

For example, in one or more embodiments, the for-sale listing manager 108 can make this determination by consider information specific to the submission. Information specific to the submission can include, but not limited to, whether the submission includes a digital photograph featuring an item (i.e., posts tend to include photographs of people while sale listings tend to include photographs of items), whether the submission includes a digital video featuring an item (i.e., posts tend to include videos of people while sale listings tend to include videos of items), or whether the text associated with the submission includes transactional language. In one or more embodiments, the for-sale listing manager 108 may determine that a submission including any of this information is a sale listing rather than a post.

The for-sale listing manager 108 can further augment the analysis of a particular submission by analyzing the submission for sale listing indicators. Sale listing indicators can include, but are not limited to, time spent by social networking system users viewing a submission (i.e., users tend to spend more time reading posts rather than sale listings), a social networking system relationship between the user who made the submission and another user who interacts with the submission (i.e., social networking system "friends" tend to view/comment on/like posts while there tends to be no relationship between a sale listing submitter and a social networking system user who views/comments on/likes the sale listing), a social networking system relationship between two or more users who interact with a submission (i.e., users who view/comments on/like a single post tend to be friends with each other or friends-of-friends, etc. while users who view/comments on/like a sale listing tend to have no relationship with each other), a time period that elapses between when a user makes a submission and when that submission experiences any type of social networking activity (i.e., friends of a user who submits a post tend to interact with the post quickly while a sale listing may not experience any social networking system interactions right away), a time period that elapses between when a user makes a submission and when the submission is eventually removed (i.e., posts tend to remain "active" indefinitely while sale listings are generally "deactivated" or removed from a for-sale group once the item advertised therein has been sold), transactional language in one or more comments associated with each of the plurality of posts, or transactional language in one or more messages associated with each of the plurality of posts. "Transactional" language can include, but not limited to: interest indicating language (e.g., "I am very interested in this item"), price negotiation language (e.g., "will you take $40?"), pick-up/drop-off language (e.g., "I'll meet you at the parking lot at the corner of $5^{th}$ Street and Lincoln at 5 pm"), contact details language (e.g., "Call me at 555-555-5555"), sale-related acronyms (e.g., "OBO" means "or best offer," "ISO" means "in search of", etc.) etc.

In response to identifying information specific to a particular submission as well as sale listing indicators associated with the particular submission, the for-sale listing manager 108 can determine whether the particular submission is a sale listing. To make this determination, the for-sale listing manager 108 may weight certain information or indicators as being more determinative of the submission being a sale listing (e.g., a submission with several photographs featuring the same item is very likely a sale listing, etc.). Furthermore, for-sale listing manager 108 may assign a numerical value to different types of information and sale listing indicators, which the for-sale listing manager 108 may then tally into a score for the submission. If the submission's score is above a predetermined threshold, the for-sale listing manager 108 can determine that the submission is a sale listing. In one or more embodiments, the determination may also include a consideration of structured data associated with the submission. The for-sale listing manager 108 can utilize natural language processing, grammars, databases, web look-ups, or any other technique for analyzing text in making any of these determinations.

Additionally, the for-sale listing manager 108 can determine likes or interests of a social networking system user. As described above, the social networking system activity manager 106 can receive a wide range of information associated with a particular social networking system user (e.g., the user's social networking system activities, demographic information, social networking system relationships, etc.). In one or more embodiments, the for-sale listing manager 108 can utilize this identified information to determine interests of the social networking system user. For example, the for-sale listing manager 108 can identify themes, topics, and subjects that are common across social networking system web pages navigated to by the user. In another example, the for-sale listing manager 108 can identify themes, topics, and subjects that are common across posts that the user "likes." In yet another example, the for-sale listing manager 108 can identify themes, topics, and subjects that are common across favorite movies the user lists as part of his social networking system profile.

Once the for-sale listing manager 108 has identified likes or interests of a social networking system user, the for-sale listing manager 108 can identify sale listings that will likely be of interest to the social networking system user. For example, if the for-sale listing manager 108 identifies rock climbing as an interest of a particular social networking system user, the for-sale listing manager 108 can identify sale listings that are associated with rock climbing. The for-sale listing manager 108 can determine that a sale listing is associated with a particular interest by utilizing natural language processing, grammars, databases, web look-ups, or any other technique for analyzing text, digital media (e.g., photographs, videos), or other structured data.

Additionally, the for-sale listing manager 108 can create a personalized newsfeed of sale listings for a particular social networking system user. For example, as described above, rather than navigating to multiple for-sale groups in order to view the sale listings displayed therein, the for-sale group manager 104 can provide a personalized newsfeed (e.g., a "town square") of sale listings for the social networking system user such that the social networking system user only has to navigate to the personalized newsfeed in order to view sale listings. In one or more embodiments, the for-sale listing manager 108 can create the personalized newsfeed by analyzing the social networking system user's for-sale group memberships, identifying all sale listings contained in the for-sale groups associated with the user's for-sale group memberships, and aggregating all the identified sale listings into a single personalized newsfeed. Alternately, the for-sale listing manager 108 can create the personalized newsfeed by identifying all sale listings across all for-sale groups, determining one or more interests of the social networking system user, identifying sale listings that are likely of interest to the social networking system user, and aggregating the identified interesting sale listings into a single personalized newsfeed.

Furthermore, once the for-sale listing manager 108 has created a personalized newsfeed of sale listings for a particular social networking system user, the for-sale listing manager 108 can reorder the personalized newsfeed such that sale listings that are of particular interest to the social networking system user and/or are particularly popular among the social networking system community are prominently displayed in the personalized newsfeed. For example, the for-sale listing manager 108 can identify sale listing that are of particular interest to a social networking system user by assigning a weight to various interests of the user such that highly regarded interests are more heavily weighted. The for-sale listing manager 108 can identify highly regarded interests of a user by analyzing the user's social networking system activity, demographic information, profile data, etc. for frequently found subjects, topics, and themes. From this, the for-sale listing manager 108 can determine that a particular interest is highly regarded by a user among all of the user's interests and weight the particular interest accordingly. The for-sale listing manager 108 can then identify sale listings associated with interests that have weights above a predetermined threshold to prominently position within the personalized newsfeed.

Additionally or alternatively, the for-sale listing manager 108 can identify sale listings that are particularly popular among the social networking system community, or are associated with popular topics among the social networking system community. For example, the for-sale listing manager 108 can identify popular sale listings by analyzing web traffic across sale listings and for-sale groups. Sale listings and for-sale groups that are heavily trafficked are likely popular. The for-sale listing manager 108 can also identify popular sale listings that are associated with an above average amount of social networking system activity (e.g., a sale listing with a high number of likes, comments, messages, etc. is likely a popular sale listing). Also, the for-sale listing manager 108 can identify popular sale listings by identifying sale listings that advertise a particular item that is popular (e.g., the item experiences a large volume of sales based on for-sale group data, web data, etc.).

In one or more embodiments, the for-sale listing manager 108 can identify popular sale listings by identifying sale listings that are associated with popular topics among the social networking system community (e.g., a sale listing advertising a bike is associated with cycling which may be a popular topic in a geographic area where cycling is a popular sport). The for-sale listing manager 108 can identify popular topics among the social networking system community by analyzing social networking system activity by utilizing natural language processing, grammars, databases, web look-ups, or any other technique for analyzing text, digital media (e.g., photographs, videos), or other structured data for common themes, subjects, topics, etc. Once the for-sale listing manager 108 has identified popular topics among the social networking system community, the for-sale listing manager 108 can identify sale listings that are associated with the identified popular topics.

As mentioned above, the for-sale listing manager 108 can reorder a personalized listing such that sale listings that are particularly interesting to a social networking system user and/or are particularly popular are prominently positioned. In one or more embodiments, the for-sale listing manager 108 can prominently position a sale listing by placing the sale listing at the head of the personalized newsfeed. Additionally or alternatively, the for-sale listing manager 108 may prominently position a sale listing by placing the sale listing in the middle or at the bottom of the personalized newsfeed. Furthermore, the for-sale listing manager 108 may draw added attention to a sale listing by changing the display of the sale listing compared to other sale listings in the personalized newsfeed (e.g., by adding a border, changing a font, changing a color, adding a display element, etc.).

Furthermore, as mentioned above, and as illustrated in FIG. 1, the for-sale group manager 104 can also include a data storage 110. As shown, the data storage 110 can include social networking system activity data 112 and for-sale listing data 114. In one or more embodiments, the social networking system activity data 112 can include data representative of social networking system activity information, such as described herein. Similarly, in one or more embodiments, for-sale listing data 114 can include data representative of for-sale listing (or sale listing) information, such as described herein.

Figure 2:
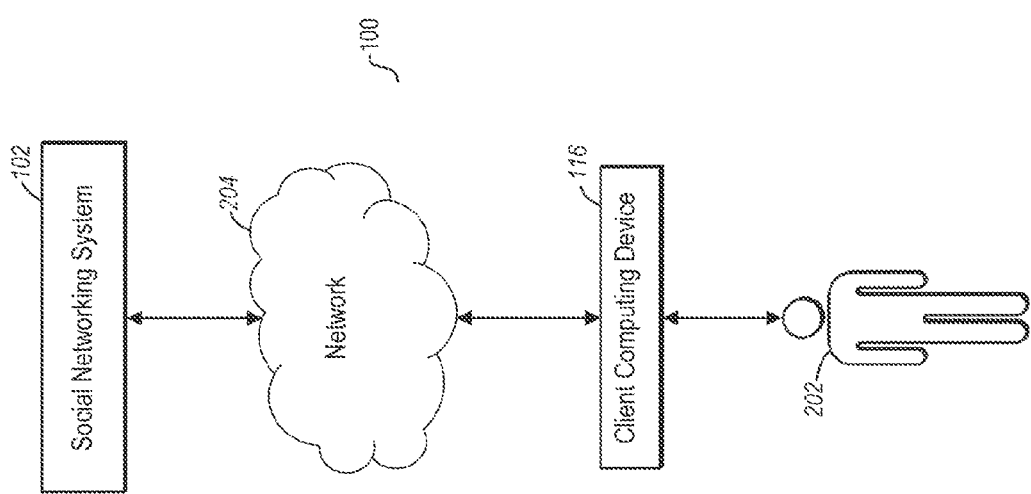
FIG. 2 illustrates a block diagram of an environment for implementing the for-sale group system in accordance with one or more embodiments.

FIG. 2 illustrates an example schematic diagram of the for-sale group system 100. As illustrated in FIG. 2, the for-sale group system 100 may include a client computing device 116, and the social networking system 102, which are communicatively coupled through a network 204. Also as illustrated in FIG. 2, a user 202 may interact with the client computing device 116 in order to access content and/or services on the social networking system 102. The client computing device 116 may access the social networking system 102 via the social networking application 118, as described above with reference to FIG. 1.

The client computing device 116 and the social networking system 102 can communicate via the network 204, which may include one or more networks and may use one or more communication platforms or technologies suitable for transmitting data and/or communication signals. In one or more embodiments, the network 204 may include the Internet or World Wide Web. The network 204, however, can include various other types of networks that use various communication technologies and protocols, such as a corporate intranet, a virtual private network (VPN), a local area network (LAN), a wireless local network (WLAN), a cellular network, a wide area network (WAN), a metropolitan area network (MAN), or a combination of two or more such networks. Although FIG. 2 illustrates a particular arrangement of the client computing device 116, the social networking system 102, and the network 204, various additional arrangements are possible. For example, the client computing device 116 may directly communicate with the social networking system 102, bypassing the network 204. Additional details relating to the network 204 are explained below with reference to FIG. 8.

As illustrated in FIG. 2, the for-sale group system 100 can include the user. As described above, the user 202 may be an individual (i.e., a human user), a business, a group, or another entity. Although FIG. 2 illustrates one user 202, it is understood that the for-sale group system 100 can include a plurality of users, with each of the plurality of users interacting with the for-sale group system 100 through a corresponding plurality of client computing devices.

With referent to the for-sale group system 100 described herein, the user 202 may be a sender of a social networking system post or message, or a recipient of a social networking system post or message. Furthermore, the user 202 may submit and view sale listings via for-sale groups hosted by the social networking system 102. In some embodiments, a for-sale group may require the user 202 to become a group member before the user 202 is allowed to submit and view sale listings. In other embodiments, a for-sale group may have an open policy that allows the user 202 to submit and view sale listings without being members of the for-sale group.

The client computing device 116 may include various types of computing devices. For example, the client computing device 116 can include a mobile device such as a mobile telephone, a smartphone, a PDA, a tablet, a laptop or a non-mobile device such as a desktop, a server, or another type of computing device. Further, the client computing device 116 may run dedicated social networking applications (e.g., such as the social networking application 118, as described above in relation to FIG. 1) associated with the social networking system 102 to access social networking content (e.g., posts, messages, sale listings, profiles, etc.) associated with the for-sale group system 100. Additional details with respect to the client computing device 116 are discussed below with respect to FIG. 7.

As described above, the systems and methods performed by the for-sale group system 100 serve to identify sale listings among for-sale groups and create a personalized newsfeed for a social networking system user. The for-sale group system 100 can also utilize social networking system activity to reorder the personalized newsfeed in order to prominently position sale listings that are popular and/or are of particular interest to the social networking system user. The systems and methods of the for-sale group system 100 will now be explained in connection with FIG. 3.

Figure 3:
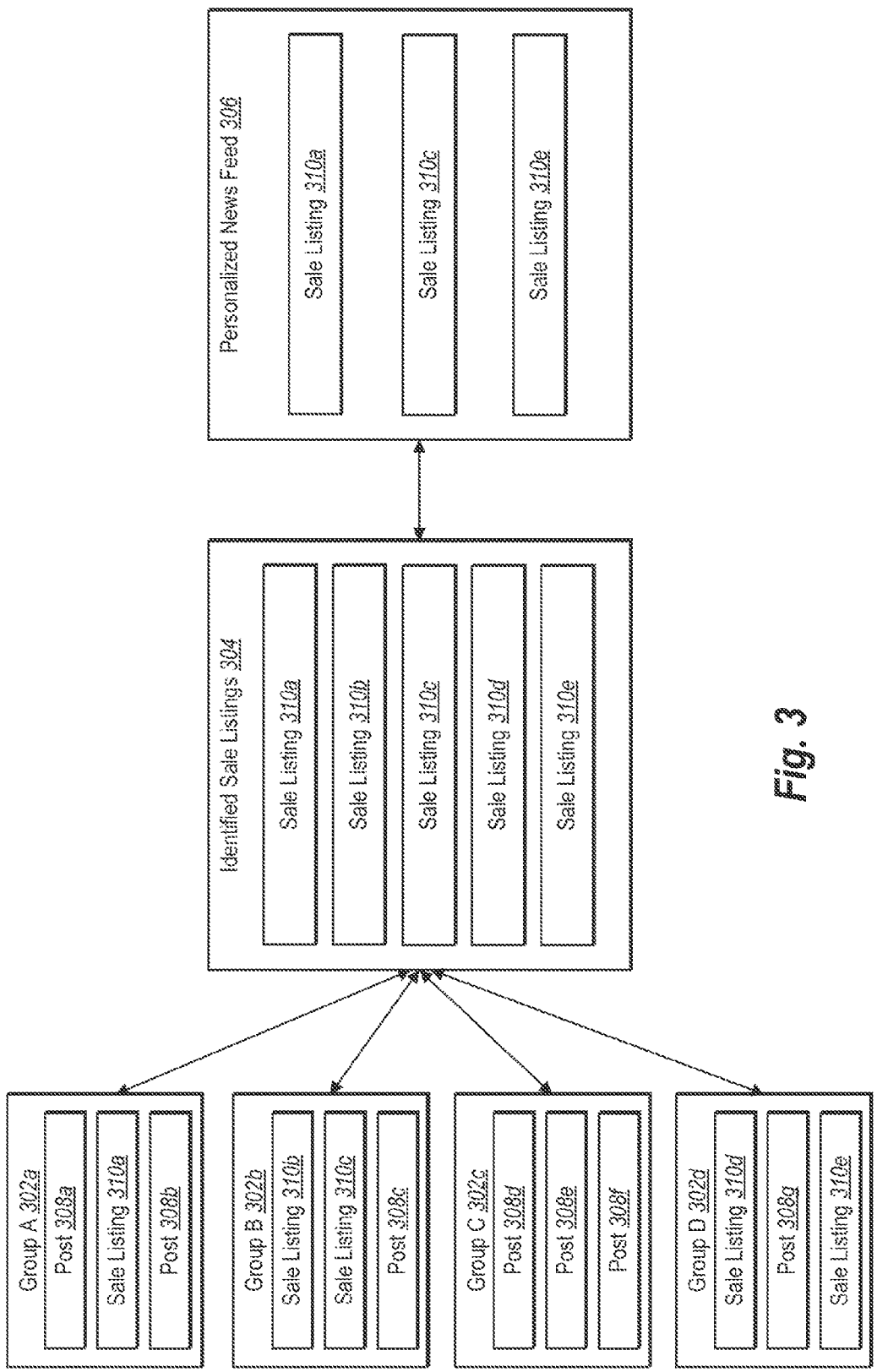
FIG. 3 illustrates a schematic diagram of the for-sale group system generating a personal town square in accordance with one or more embodiments.

FIG. 3 illustrates a schematic diagram representing the process by which the for-sale group system 100 creates a personalized newsfeed for a particular social networking system user (e.g., the user 202). The process begins when the for-sale group manager 104 identifies one or more groups 302a, 302b, 302c, and 302d. In one or more embodiments, the groups 302a-302d can be for-sale groups, as described above, or can be other types of groups hosted by the social networking system 102 (e.g., discussion groups, review groups, neighborhood groups, etc.). In one embodiment, the for-sale group manager 104 identifies the groups 302a-302d based on the user's 202 membership in each of the groups 302a-302d. In another embodiment, the for-sale group manager 104 identifies the groups 302a-302d simply as groups hosted by the social networking system 102, and not based on the user's 202 membership records.

As shown in FIG. 3, each of the groups 302a-302d includes various combinations of posts and sale listings. For example, the group 302a (i.e., "Group A") includes posts 308a, 308b and sale listing 310a, the group 302b (i.e., "Group B") includes sale listings 310a, 310b and post 308c, the group 302c (i.e., "Group C") includes posts 308d, 308e, 308f, and the group 302d (i.e., "Group D") includes sale listings 310d, 310e and post 308g. The posts and sale listings with each group 302a, 302b, 302c, and 302d may be organized chronologically, according to theme, according to popularity, etc.

As mentioned above, in some embodiments, the social networking system users who submitted the posts and sale listings within each group 302a, 302b, 302c, and 302d may have had no mechanism to specifically denote a submission as either a post or a sale listing. Accordingly, once the for-sale group manager 104 identifies the groups 302a-302d, the for-sale group manager 104 can next identify the submissions in each group 302a-302d that are actually sale listings. As described above, in one or more embodiments, the for-sale group manager 104 identifies sale listings within each of the groups 302a-302d by analyzing information specific to each submission (i.e., a post or a sale listing), and by analyzing social networking system activity associated with each submission.

By way of example, the for-sale group manager 104 can begin by analyzing the post 308a to determine whether the post 308a is in fact a sale listing. In one or more embodiments, the for-sale group manager 104 can analyze information specific to the post 308a including, but not limited to, the content of the post 308a and structured data associated with the post 308a (e.g., information about the author of the post 308a, the date and time the post 308a was submitted). The for-sale group manager 104 may determine that the post 308a is not a sale listing in light of a lack of content-based sale listing indicators. For example, the content of the post 308a may include pictures of people and not items, text that does not include any transactional language, etc. The for-sale group manager 104 may make this determination based on a weighted score system, as described above.

After determining that that post 308a is likely not an actual sale listing, the for-sale group manager 104 can further bolster this determination by analyzing social networking system activity associated with the post 308a. In one or more embodiments, the for-sale group manager 104 can analyze the post 308a for social networking system activity-based sale listing indicators such as, but not limited to, time spent by social networking system users viewing the post 308a, a social networking system relationship between the author of the post 308a and another user who interacts with the post 308a, a social networking system relationship between two or more users who interact with the post 308a, transactional language in one or more comments associated with the post 308a, transactional language in one or more messages associated with the post 308a, etc. For example, the for-sale group manager 104 can further determine that the post 308a is likely not a sale listing based on the comments associated with the post 308a being authored by users who are "friends" with the author of the post 308a, a lack of transactional language in any comment or message associated with the post 308a, etc.

Once the for-sale group manager 104 has determined that the post 308a is likely not a sale listing, the for-sale group manager 104 can move to a determination as to whether the sale listing 310a is an actual sale listing. In one or more embodiments, the for-sale group manager 104 can make this determination in the same manner as described above. For example, the for-sale group manager 104 can analyze information associated with the sale listing 310a as well as social networking system activity associated with the sale listing 310a to determine that the sale listing 310a is indeed a sale listing.

The for-sale group manager 104 can repeat this process with all the posts and sale listings in each of the groups 302a-302d until the for-sale group manager 104 has a list of identified sale listings 304, as shown in FIG. 3. In one or more embodiments, the list of identified sale listings 304 includes all identified sale listings 310a-310e from the groups 302a-302d. As mentioned above, the groups 302a-302d may or may not self-identify as for-sale groups. Additionally as mentioned above, the user 202 may or may not be a member of each of the groups 302-302d.

After the for-sale group manager 104 has compiled the list of identified sale listings 304, the for-sale group manager 104 can generate a personalized newsfeed of sale listings for the user 202. As shown in FIG. 3, the personalized newsfeed 306 may not include all of the sale listings 310a-310e from the list of identified sale listings 304. In one or more embodiments, the for-sale group manager 104 may generate the personalized newsfeed 306 based on either the likes and personal interests of the user 202, particularly popular sale listings among a community associated with the user 202, or both the user's interests and popular sale listings.

In order to identify sale listings that will be interesting to the user 202, the for-sale group manager 104 must first determine the likes and interests of the user 202. In one or more embodiments, the for-sale group manager 104 can make this determination based on an analysis of the user's social networking system activity, demographic information, profile data, etc. for frequently utilized subjects, topics, and themes. For example, the for-sale group manager 104 may determine that the user 202 is interested in parenting after analyzing social networking system activity associated with the user 202 to find that the user 202 often shares parenting articles via the social networking system 102, frequently comments on posts of friends that discuss parenting topics, etc. Additionally, the for-sale group manager 104 may determine that the user 202 is interested in parenting after analyzing demographic information associated with the user 202 to find that the user 202 is within an age range when people typically have children, is friends with other social networking system users who have profile data indicating that they have children, etc. In this manner, the for-sale group manager 104 can identify one or more likes or interests of the user 202. Furthermore, the for-sale group manager 104 can use a weighted scoring system, as described above, to determine interests that are highly regarded by the user 202 among all the user's identified interests.

Similarly, the for-sale group manager 104 can identify one or more sale listings within the list of identified sale listings 304 that are popular within a particular social networking system community. In one or more embodiments, the for-sale group manager 104 can perform this determination by analyzing web traffic across the sale listings 310a-310e and the for-sale groups 302a-302d, by identifying sale listings in the list of identified sale listings 304 that experience an above average amount of social networking system activity, by identifying sale listings that are associated with popular topics in the particular social networking system community, etc. The for-sale group manager can base the applicable social networking system community on the user's 202 profile, demographic information, location, etc. For example, the for-sale group manager 104 can determine that rock climbing is popular within the geographic area where the user 202 lives in response to determining a high amount of web traffic from users in the geographic area where the user 202 lives that is related to rock climbing (i.e., web page visits, clicks, views, etc.), by identifying a high number of social networking system posts and sale listings submitted by users in the geographic area where the user 202 lives that are associated with rock climbing, etc.

Once the for-sale group manager 104 has identified interests of the user 202 and/or popular sale listings and topics within a relevant social networking system community, the for-sale group manager 104 can determine which sale listings within the list of identified sale listings 304 to include in the personalized newsfeed 306 for the user 202. In one or more embodiments, the for-sale group manager 104 can make this determination by utilizing various textual analysis techniques (e.g., natural language processing, web lookups, grammars), image analysis techniques, and structured data analysis to identify one or more sale listings that are related to the interests of the user 202 and/or popular sale listings and topics within a relevant social networking system community. In making this determination, the for-sale group manager 104 may utilize a weighted scoring system to identify sale listings that are above a predetermined threshold in terms of interestedness and popularity.

Figure 4:
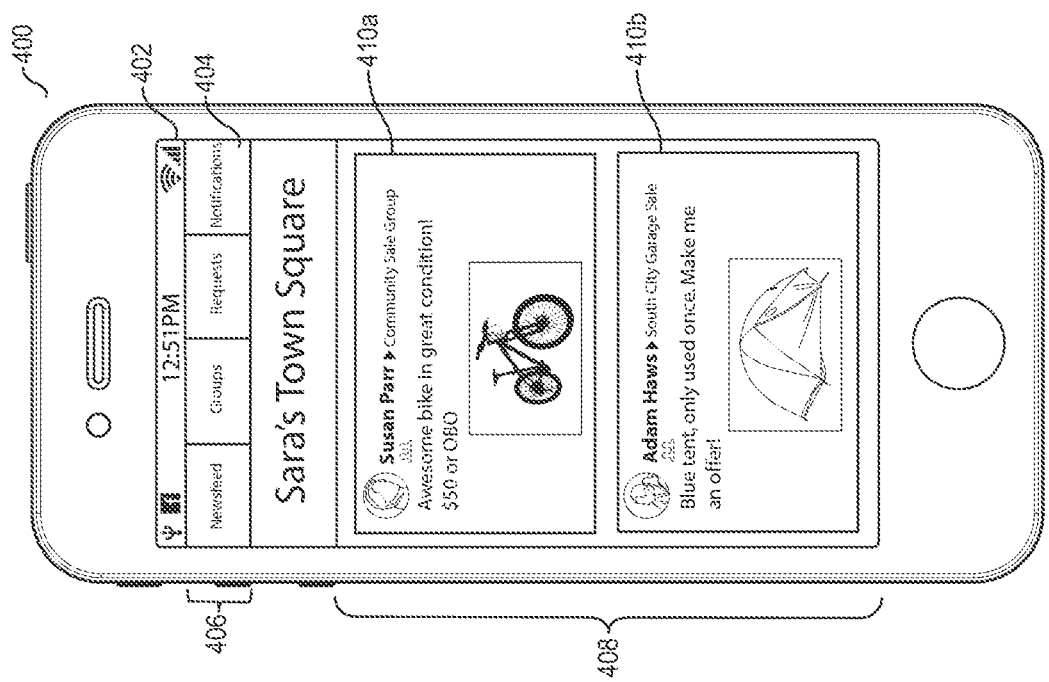
FIG. 4 illustrates a user interface for facilitating display of a personal town square in accordance with one or more embodiments.

Accordingly, after the for-sale group manager 104 determines to include sale listings 310a, 310c, and 310e in the personalized newsfeed 306, the for-sale group manager 104 can provide the personalized newsfeed 306 to the social networking application 118 for display to the user 202. For example, FIG. 4 illustrates a display 402 of a mobile device 400 displaying a newsfeed graphical user interface 404 ("GUI"). In one or more embodiments, the newsfeed GUI 404 a selection of navigational tabs 406 and the personalized newsfeed display 408. The selection of navigational tabs 406 can include various tab controls that serve to help the user 202 navigated through various social networking system GUIs.

As shown in FIG. 4, the personalized newsfeed display 408 can include the interactive sale listing elements 410a, 410b. In one or more embodiments, the interactive sale listing elements 410a, 410b are representative of the sale listings identified by the for-sale group manager 104 as being associated with popular topics amount a social networking system community and/or with one or more interests of the user 202 (i.e., such as described above with reference to sale listings 310a, 310c, and 310e in the personalized newsfeed 306 of FIG. 3). Each interactive sale listing element 410a, 410b can include information related to the sale listing author (e.g., "Susan Parr," "Adam Haws"), information related to the for-sale group from which the sale listing was identified (e.g., "Community Sale Group," "South City Garage Sale"), and descriptions and media related to an item being advertised via the sale listing. Additionally, each interactive sale listing element 410a, 410b can be associated with structured data, as described above.

In one or more embodiments, the for-sale group manager 104 may reorder interactive sale listing elements so as to prominently position sale listings that are of particular interest to the user, as well as to de-emphasize other sale listings. For example, as shown in FIG. 4, in response to the for-sale group manager 104 determining that the user 202 is particularly interested in cycling, the for-sale group manager 104 can position the interactive sale listing element 410a so as to bring that sale listing to the user's 202 attention. In one embodiment, the for-sale group manager 104 may do this by positioning the interactive sale listing element 410a at the top of the personalized newsfeed display 408. In an additional or alternative embodiment, the for-sale group manager 104 may prominently position the interactive sale listing element 410a in the middle or at the bottom of the personalized newsfeed display 408. The for-sale group manager 104 can also draw attention to the interactive sale listing element 410a by adding a border, changing a font, changing a color, etc.

In one or more embodiments, the for-sale group manager 104 may de-emphasize a sale listing for several reasons. For example, the for-sale group manager 104 may de-emphasize a sale listing in response to determining that the sale listing is not strongly related to an interest of the user 202. In another example, the for-sale group manager 104 may de-emphasize a sale listing in response to determining that the item advertised in the sale listing has likely been sold and is no longer available (e.g., by analyzing social networking activity and other information associated with the sale listing). The for-sale group manager 104 can de-emphasize a sale listing by positioning the sale listing at the bottom of the personalized newsfeed, by changing the border or font of the sale listing, or by adding a visual element to the sale listing.

FIGS. 1-4, the corresponding text, and the examples, provide a number of different methods, systems, and devices for managing electronic messages via a social networking system. In addition to the foregoing, embodiments can also be described in terms of flowcharts comprising acts and steps in a method for accomplishing a particular result. For example, FIGS. 5-6 may be performed with less or more steps/acts or the steps/acts may be performed in differing orders. Additionally, the steps/acts described herein may be repeated or performed in parallel with one another or in parallel with different instances of the same or similar steps/acts.

Figure 5:
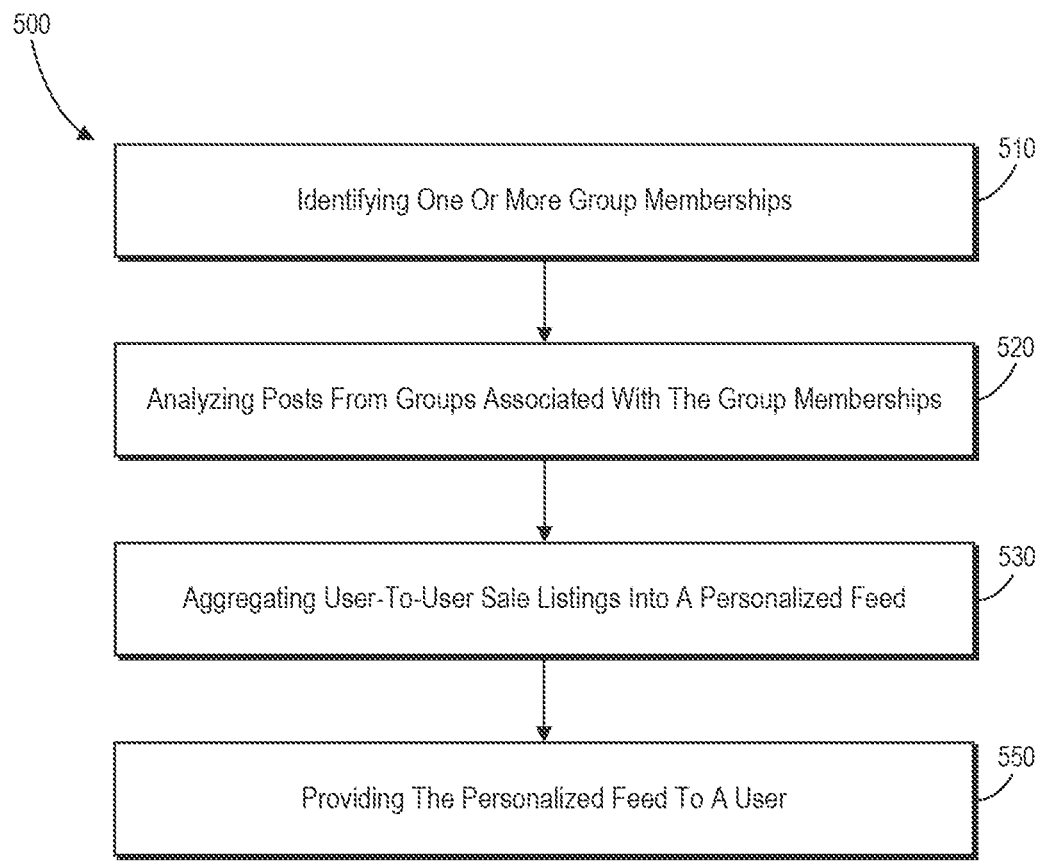
FIG. 5 illustrates a flowchart of a series of acts in a method of managing social networking system for-sale groups in accordance with one or more embodiments.

FIG. 5 illustrates a flowchart of one example method 500 of managing a social networking system for-sale group. The method 500 includes an act 510 of identifying one or more group memberships. In particular, the act 510 can involve identifying, for a social networking system user, one or more group memberships, wherein each membership indicates an association between the social networking system user and a group, and each group comprises a plurality of posts.

The method 500 further includes an act 520 of analyzing posts from groups associated with the group memberships. In particular, the act 520 can involve analyzing the plurality of posts from each of the one or more groups (e.g., posts 308a-308g and sale listings 310a-310e from groups 302a-302d) associated with the one or more group memberships to identify a plurality of user-to-user sale listings (e.g., sale listings 310a-310e). For example, analyzing the plurality of posts to identify a plurality of user-to-user sale listings can include analyzing one or more of information specific to each of the plurality of posts or social networking system activity associated with each of the plurality of posts. In one or more embodiments, analyzing information specific to each of the plurality of posts can include determining whether each of the plurality of posts comprises one or more of a digital photograph featuring an item, a digital video featuring an item, a description including transactional language, or a description including sale-related acronyms. In one or more embodiments, this can be done automatically without human intervention.

Furthermore, in one or more embodiments, analyzing social networking system activity associated with each of the plurality of posts can includes: identifying social networking system activity associated with each of the plurality of posts; analyzing the identified social networking system activity for sale listing indicators. For example, identifying social networking system activity associated with each of the plurality of posts can include identifying one or more of views of each of the plurality of posts, clicks associated with each of the plurality of posts, "likes" associated with each of the plurality of posts, one or more comments associated with each of the plurality of posts, or one or more messages associated with each of the plurality of posts. In one or more embodiments, analyzing the identified social networking system activity for sale listing indicators includes analyzing the identified social networking system activity for one or more of time spent on views of each of the plurality of posts, a social networking system relationship between an author of each of the plurality of posts and a social networking system user who performed the social networking system activity, a social networking system relationship between two or more social networking system users who performed the social networking system activity, a time period that elapsed between each of the plurality of posts becoming active and the social networking system activity, a time period that elapsed between each of the plurality of posts becoming active and a removal of each of the plurality of posts, transactional language in one or more comments associated with each of the plurality of posts, or transactional language in one or more messages associated with each of the plurality of posts. In one or more embodiments, this can be done automatically without human intervention.

Additionally, the method 400 includes an act 430 of aggregating user-to-user sale listing into a personalized newsfeed. In particular, the act 430 can involve aggregating the identified plurality of user-to-user sale listings (e.g., sale listings 310a-310e in the list of identified sale listings 304) into a personalized newsfeed (e.g., the personalized newsfeed 306) for the social networking system user. In one or more embodiments, this can be done automatically without human intervention.

Furthermore, the method 400 includes an act 440 of providing the personalized newsfeed to a user. In particular, the act 440 can involve providing, using the one or more processors, the personalized newsfeed to the social networking system user within a standalone webpage (e.g., the newsfeed GUI 404). In one or more embodiments, this can be done automatically without human intervention.

The method 400 can also include an act of reordering the personalized newsfeed based on one or more of post information specific to each of the user-to-user sale listings or social networking system activity associated with each of the user-to-user sale listings. In one or more embodiments, reordering the personalized newsfeed based on one or more of post information specific to each of the user-to-user sale listings or social networking system activity associated with each of the user-to-user sale listings comprises: identifying post information specific to each of the user-to-user sale listings that is indicative of the popularity of each of the user-to-user sale listings; identifying social networking system activity associated with each of the user-to-user sale listings that is indicative of the popularity of each of the user-to-user sale listings; reordering the personalized newsfeed such that one or more user-to-user sale listings associated with post information and social networking system activity that are indicative of the one or more user-to-user sale listings being popular are prominently positioned within the personalized newsfeed. In at least one embodiment, reordering the personalized newsfeed is based on social networking system activity associated with the user. For example, reordering the personalized newsfeed based on the social networking system activity associated with the user comprises: identifying social networking system activity associated with the user that indicates one or more of the user's interests; determining, based on the identified social networking system activity, one or more of the plurality of user-to-user sale listings that will be interesting to the user; reordering the personalized newsfeed such that the one or more user-to-user sale listings that will be interesting to the user are prominently positioned within the personalized newsfeed. In one or more embodiments, this can be done automatically without human intervention.

Figure 6:
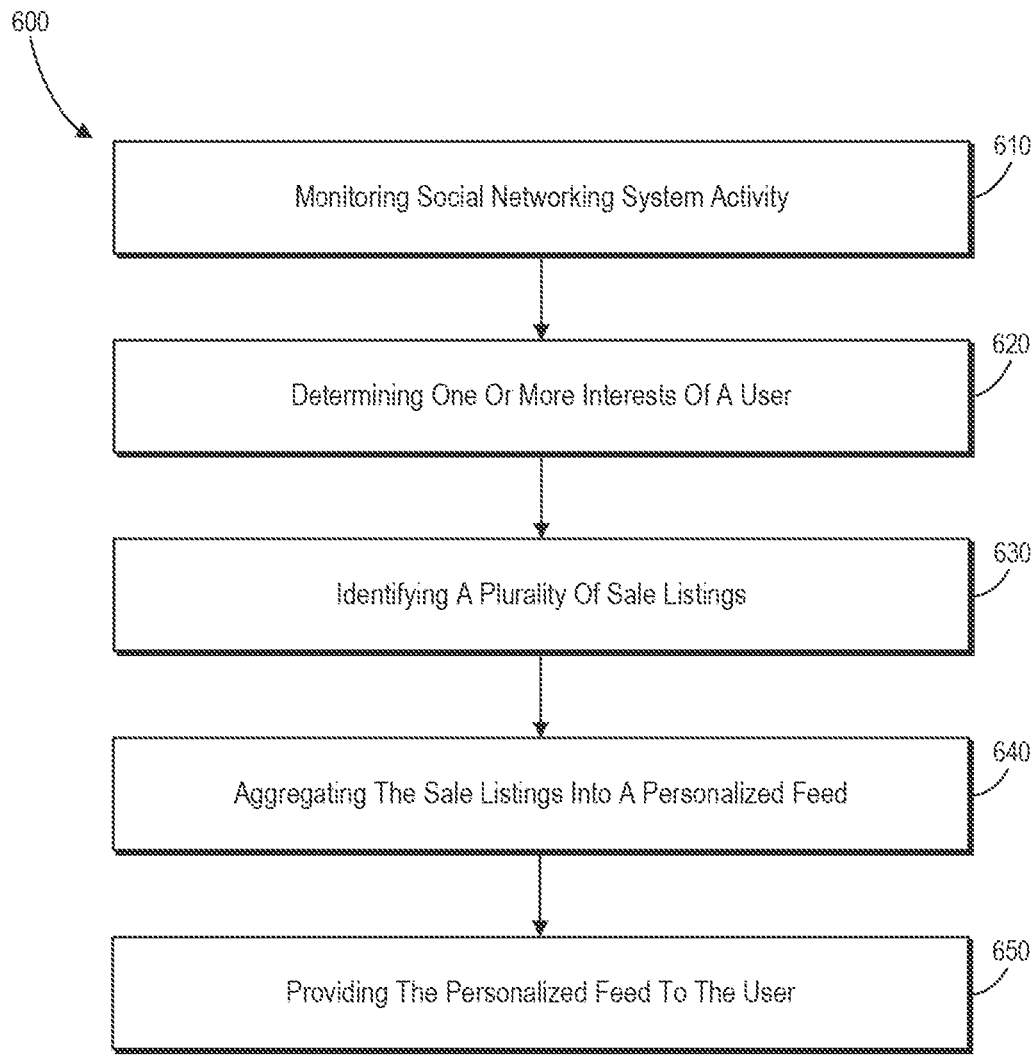
FIG. 6 illustrates a flowchart of a series of acts in a method of managing social networking system for-sale groups in accordance with one or more embodiments.

FIG. 6 illustrates a flowchart of one example method 600 of managing a social networking system for-sale group. The method 600 includes an act 610 of monitoring social networking system activity. In particular, the act 610 can involve monitoring social networking system activity associated with a user (e.g., the user 202). In one or more embodiments, monitoring social networking system activity associated with the user involves monitoring one or more of a social networking system profile associated with the user, social networking system interactions between the user and one or more other users of the social networking system, social networking system page views by the user, social networking system page likes by the user, social networking system pages associated with comments submitted by the user, social networking system pages associated with messages sent by the user, social networking system check-ins by the user, social networking system media views by the user, social networking system media uploads by the user, or social networking system tags associated with the user.

The method 600 further includes an act 620 of determining one or more interest of a user. In particular, the act 620 can involve determining, based on the monitored social networking system activity, one or more interests of the user. For example, determining one or more interests of the user can include analyzing the monitored social networking system activity for one or more common topics, subjects, or themes. In one or more embodiments, this can be done automatically without human intervention.

Furthermore, the method 600 includes an act 630 of identifying a plurality of sale listings. In particular, the act 630 can involve identifying, based on the one or more interests, a plurality of sale listings (e.g., the sale listings 310a-310e) from one or more for-sale groups (e.g., the groups 302a-302d) hosted by the social networking system (e.g., the social networking system 102). In one or more embodiments, identifying the plurality of sale listings from one or more for-sale groups hosted by the social networking system involves identifying one or more sale listings (e.g., the sale listings 310a, 310c, 310e) in the plurality of sale listings that are related to the determined one or more interests of the user (e.g., the user 202). In one or more embodiments, this can be done automatically without human intervention.

Furthermore, the method 600 can also include identifying one or more for-sale group memberships associated with the user; wherein identifying a plurality of sale listings is from one or more for-sale groups in which the user has a membership. Additionally, identifying a plurality of sale listings can be further from all for-sale groups hosted by the social networking system, regardless of the identified one or more for-sale group memberships associated with the user. In one or more embodiments, this can be done automatically without human intervention.

Additionally, the method 600 includes an act 640 of aggregating the sale listings into a personalized newsfeed. In particular, the act 640 can involve aggregating the plurality of sale listings (e.g., the sale listings 310a-310e) into a personalized newsfeed (e.g., the personalized newsfeed 306). In one or more embodiments, this can be done automatically without human intervention.

Furthermore, the method 600 includes an act 650 of providing the personalized newsfeed to the user. In particular, the act 650 can involve providing the personalized newsfeed to the user within a standalone webpage (e.g., the newsfeed GUI 404). In one or more embodiments, this can be done automatically without human intervention.

The method 600 can also include an act of ordering the plurality of sale listings (e.g., the sale listings 310a, 310c, 310e) within the personalized newsfeed (e.g. the personalized newsfeed 306) based on the determined one or more interests of the user. For example, ordering the plurality of sale listings within the personalized newsfeed based on the determined one or more interests of the user comprises: identifying one or more sale listings in the plurality of sale listings that are that are highly related to the determined one or more interests of the user; prominently positioning the identified one or more sale listings within the personalized newsfeed. In one or more embodiments, this can be done automatically without human intervention.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
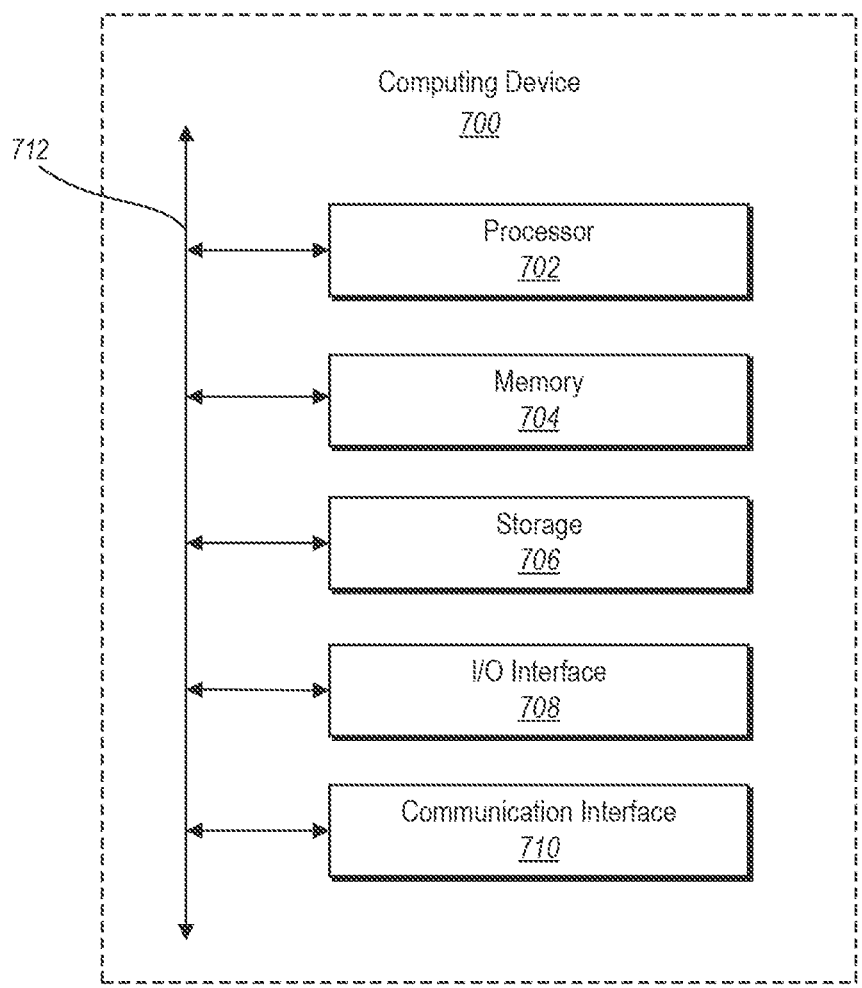
FIG. 7 illustrates a block diagram of an exemplary computing device in accordance with one or more embodiments

FIG. 7 illustrates a block diagram of exemplary computing device 700 that may be configured to perform one or more of the processes described above. One will appreciate that one or more computing devices such as the computing device 700 may implement the system 100. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 8:
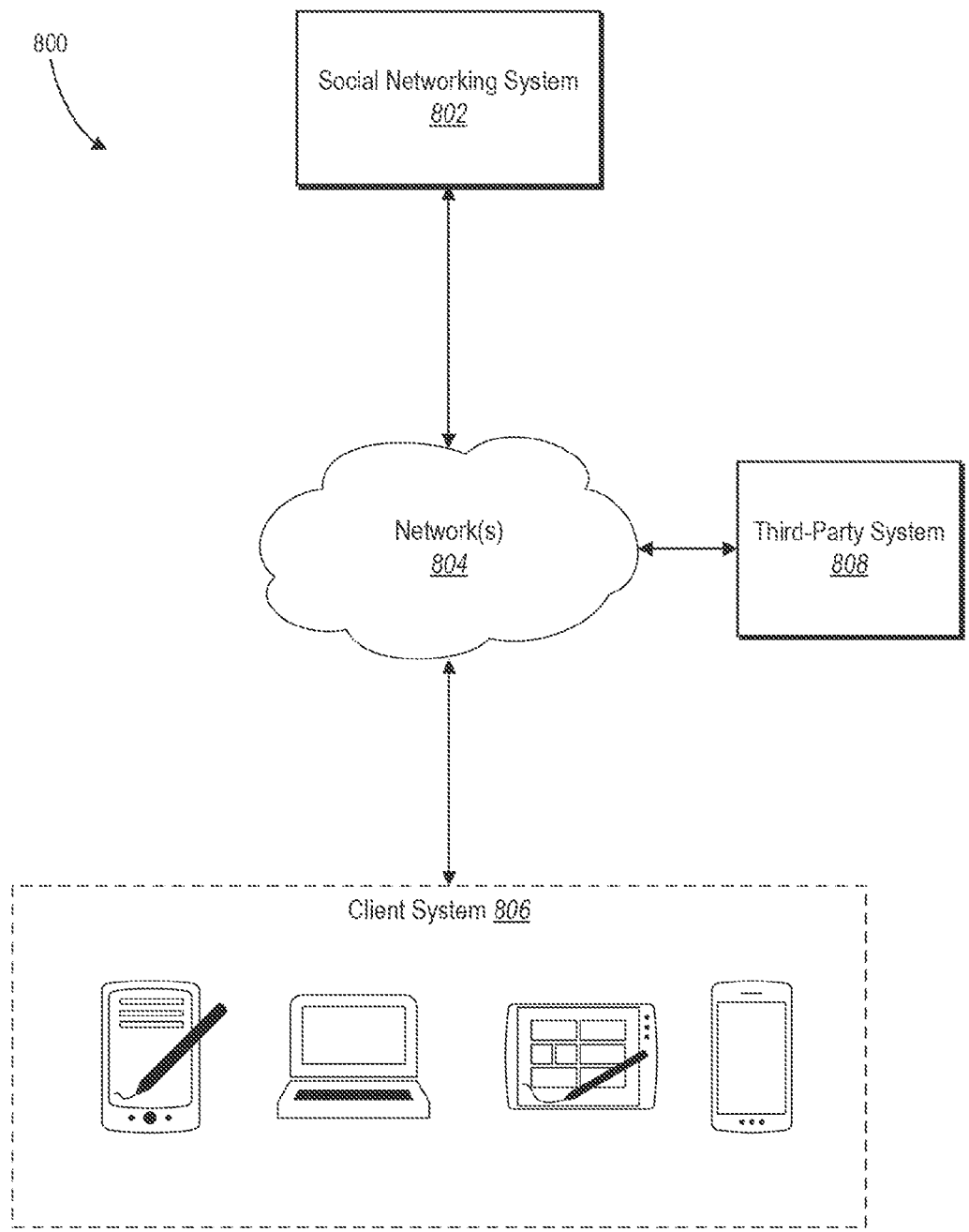
FIG. 8 is an example network environment of a social networking system in accordance with one or more embodiments.

FIG. 8 illustrates an example network environment 800 of a social networking system. Network environment 800 includes a client system 806, a social networking system 802, and a third-party system 808 connected to each other by a network 804. Although FIG. 8 illustrates a particular arrangement of client system 806, social networking system 802, third-party system 808, and network 804, this disclosure contemplates any suitable arrangement of client system 806, social networking system 802, third-party system 808, and network 804. As an example and not by way of limitation, two or more of client system 806, social networking system 802, and third-party system 808 may be connected to each other directly, bypassing network 804. As another example, two or more of client system 806, social networking system 802, and third-party system 808 may be physically or logically co-located with each other in whole or in part. Moreover, although FIG. 8 illustrates a particular number of client systems 806, social networking systems 802, third-party systems 808, and networks 804, this disclosure contemplates any suitable number of client systems 806, social networking systems 802, third-party systems 808, and networks 804. As an example and not by way of limitation, network environment 800 may include multiple client system 806, social networking systems 802, third-party systems 808, and networks 804.

This disclosure contemplates any suitable network 804. As an example and not by way of limitation, one or more portions of network 804 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 804 may include one or more networks 804.

Links may connect client system 806, social networking system 802, and third-party system 808 to communication network 804 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, client system 806 may be an electronic device including hardware, software, or embedded logic components or a combination of two or more such components and capable of carrying out the appropriate functionalities implemented or supported by client system 806. As an example and not by way of limitation, a client system 806 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 806. A client system 806 may enable a network user at client system 806 to access network 804. A client system 806 may enable its user to communicate with other users at other client systems 806.

In particular embodiments, client system 806 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 806 may enter a Uniform Resource Locator (URL) or other address directing the web browser to a particular server (such as server, or a server associated with a third-party system 808), and the web browser may generate a Hyper Text Transfer Protocol (HTTP) request and communicate the HTTP request to server. The server may accept the HTTP request and communicate to client system 806 one or more Hyper Text Markup Language (HTML) files responsive to the HTTP request. Client system 806 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 802 may be a network-addressable computing system that can host an online social network. Social networking system 802 may generate, store, receive, and send social-networking data, such as, for example, user-profile data, concept-profile data, social-graph information, or other suitable data related to the online social network. Social networking system 802 may be accessed by the other components of network environment 800 either directly or via network 804. In particular embodiments, social networking system 802 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 802 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 806, a social networking system 802, or a third-party system 808 to manage, retrieve, modify, add, or delete, the information stored in data store.

In particular embodiments, social networking system 802 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 802 may provide users of the online social network the ability to communicate and interact with other users. In particular embodiments, users may join the online social network via social networking system 802 and then add connections (e.g., relationships) to a number of other users of social networking system 802 whom they want to be connected to. Herein, the term "friend" may refer to any other user of social networking system 802 with whom a user has formed a connection, association, or relationship via social networking system 802.

In particular embodiments, social networking system 802 may provide users with the ability to take actions on various types of items or objects, supported by social networking system 802. As an example and not by way of limitation, the items and objects may include groups or social networks to which users of social networking system 802 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 802 or by an external system of third-party system 808, which is separate from social networking system 802 and coupled to social networking system 802 via a network 804.

In particular embodiments, social networking system 802 may be capable of linking a variety of entities. As an example and not by way of limitation, social networking system 802 may enable users to interact with each other as well as receive content from third-party systems 808 or other entities, or to allow users to interact with these entities through an application programming interfaces (API) or other communication channels.

In particular embodiments, a third-party system 808 may include one or more types of servers, one or more data stores, one or more interfaces, including but not limited to APIs, one or more web services, one or more content sources, one or more networks, or any other suitable components, e.g., that servers may communicate with. A third-party system 808 may be operated by a different entity from an entity operating social networking system 802. In particular embodiments, however, social networking system 802 and third-party systems 808 may operate in conjunction with each other to provide social-networking services to users of social networking system 802 or third-party systems 808. In this sense, social networking system 802 may provide a platform, or backbone, which other systems, such as third-party systems 808, may use to provide social-networking services and functionality to users across the Internet.

In particular embodiments, a third-party system 808 may include a third-party content object provider. A third-party content object provider may include one or more sources of content objects, which may be communicated to a client system 806. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 802 also includes user-generated content objects, which may enhance a user's interactions with social networking system 802. User-generated content may include anything a user can add, upload, send, or "post" to social networking system 802. As an example and not by way of limitation, a user communicates posts to social networking system 802 from a client system 806. Posts may include data such as status updates or other textual data, location information, photos, videos, links, music or other similar data or media. Content may also be added to social networking system 802 by a third-party through a "communication channel," such as a newsfeed or stream.

In particular embodiments, social networking system 802 may include a variety of servers, sub-systems, programs, modules, logs, and data stores. In particular embodiments, social networking system 802 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 802 may also include suitable components such as network interfaces, security mechanisms, load balancers, failover servers, management-and-network-operations consoles, other suitable components, or any suitable combination thereof. In particular embodiments, social networking system 802 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 802 to one or more client systems 806 or one or more third-party system 808 via network 804. The web server may include a mail server or other messaging functionality for receiving and routing messages between social networking system 802 and one or more client systems 806. An API-request server may allow a third-party system 808 to access information from social networking system 802 by calling one or more APIs. An action logger may be used to receive communications from a web server about a user's actions on or off social networking system 802. In conjunction with the action log, a third-party-content-object log may be maintained of user exposures to third-party-content objects. A notification controller may provide information regarding content objects to a client system 806. Information may be pushed to a client system 806 as notifications, or information may be pulled from client system 806 responsive to a request received from client system 806. Authorization servers may be used to enforce one or more privacy settings of the users of social networking system 802. A privacy setting of a user determines how particular information associated with a user can be shared. The authorization server may allow users to opt in to or opt out of having their actions logged by social networking system 802 or shared with other systems (e.g., third-party system 808), such as, for example, by setting appropriate privacy settings. Third-party-content-object stores may be used to store content objects received from third parties, such as a third-party system 808. Location stores may be used for storing location information received from client systems 806 associated with users. Advertisement-pricing modules may combine social information, the current time, location information, or other suitable information to provide relevant advertisements, in the form of notifications, to a user.

Figure 9:
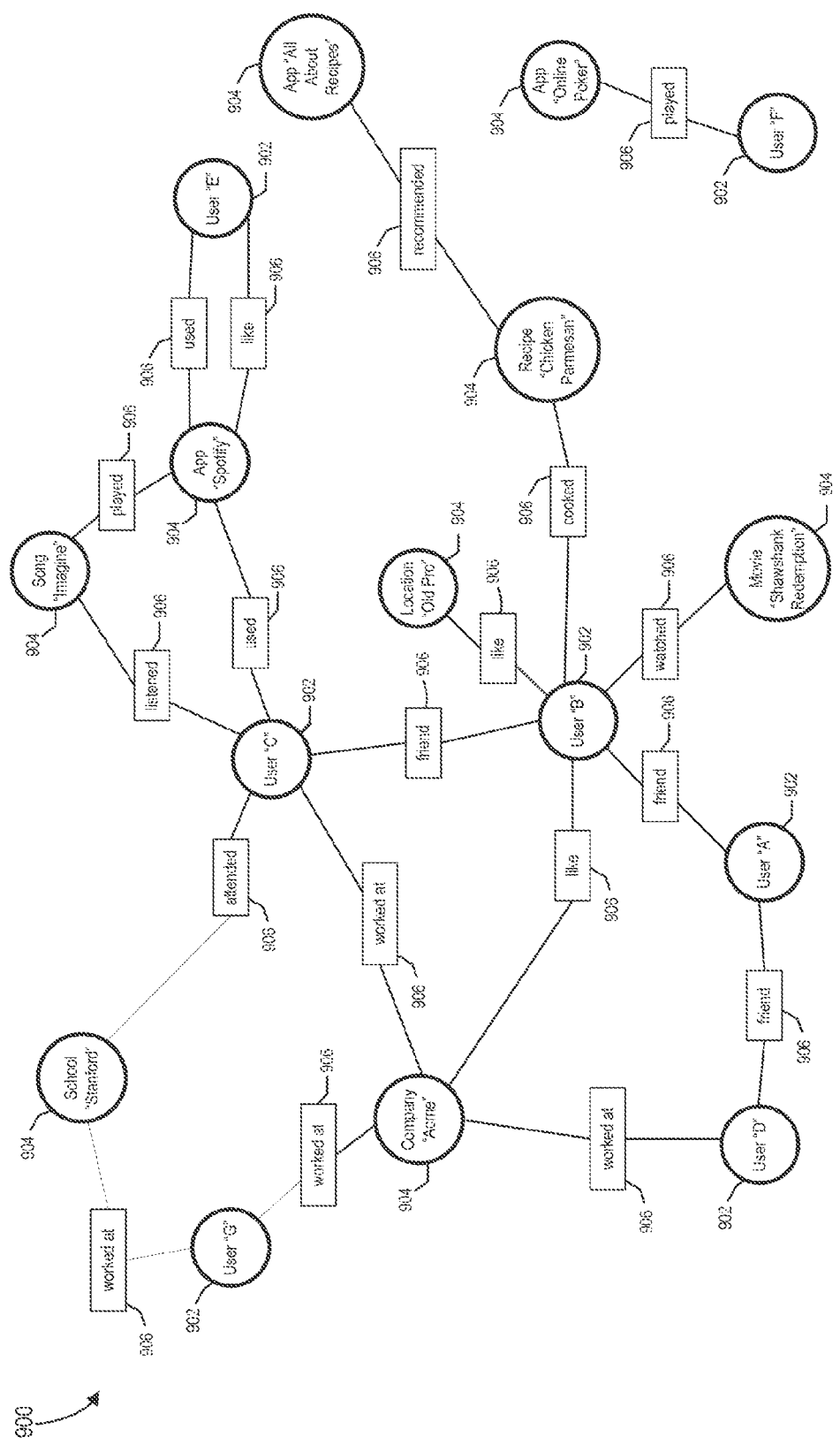
FIG. 9 illustrates a social graph in accordance with one or more embodiments.

FIG. 9 illustrates example social graph 900. In particular embodiments, social networking system 802 may store one or more social graphs 900 in one or more data stores. In particular embodiments, social graph 900 may include multiple nodes—which may include multiple user nodes 902 or multiple concept nodes 904—and multiple edges 906 connecting the nodes. Example social graph 900 illustrated in FIG. 9 is shown, for didactic purposes, in a two-dimensional visual map representation. In particular embodiments, a social networking system 802, client system 806, or third-party system 808 may access social graph 900 and related social-graph information for suitable applications. The nodes and edges of social graph 900 may be stored as data objects, for example, in a data store (such as a social-graph database). Such a data store may include one or more searchable or query able indexes of nodes or edges of social graph 900.

In particular embodiments, a user node 902 may correspond to a user of social networking system 802. As an example and not by way of limitation, a user may be an individual (human user), an entity (e.g., an enterprise, business, or third-party application), or a group (e.g., of individuals or entities) that interacts or communicates with or over social networking system 802. In particular embodiments, when a user registers for an account with social networking system 802, social networking system 802 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social networking system 802. In particular embodiments, a user node 902 may be associated with information provided by a user or information gathered by various systems, including social networking system 802. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more webpages.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 802 or a third-party website associated with a web-application server); an entity (such as, for example, a person, business, group, sports team, or celebrity); a resource (such as, for example, an audio file, video file, digital photo, text file, structured document, or application) which may be located within social networking system 802 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 904 may be associated with information of a concept provided by a user or information gathered by various systems, including social networking system 802. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social networking system 802. Profile pages may also be hosted on third-party websites associated with a third-party server 908. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system 808. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 806 to send to social networking system 802 a message indicating the user's action. In response to the message, social networking system 802 may create an edge (e.g., an "eat" edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social networking system 802 may send a "friend request" to the second user. If the second user confirms the "friend request," social networking system 802 may create an edge 906 connecting the first user's user node 902 to the second user's user node 902 in social graph 900 and store edge 906 as social-graph information in one or more of data stores. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to a edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social networking system 802 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 802 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social networking system 802 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social networking system 802 may create an edge 906 between a user node 902 and a concept node 904 in social graph 900. As an example and not by way of limitation, a user viewing a concept-profile page (such as, for example, by using a web browser or a special-purpose application hosted by the user's client system 806) may indicate that he or she likes the concept represented by the concept node 904 by clicking or selecting a "Like" icon, which may cause the user's client system 806 to send to social networking system 802 a message indicating the user's liking of the concept associated with the concept-profile page. In response to the message, social networking system 802 may create an edge 906 between user node 902 associated with the user and concept node 904, as illustrated by "like" edge 906 between the user and concept node 904. In particular embodiments, social networking system 802 may store an edge 906 in one or more data stores. In particular embodiments, an edge 906 may be automatically formed by social networking system 802 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a newsfeed or ticker item on social networking system 802). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within newsfeeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 802 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 802) or RSVP (e.g., through social networking system 802) to an event associated with the advertisement. In addition or as an alternative, an advertisement may include social-networking-system context directed to the user. As an example and not by way of limitation, an advertisement may display information about a friend of the user within social networking system 802 who has taken an action associated with the subject matter of the advertisement.

In particular embodiments, social networking system 802 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 802 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 802 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 802 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 802 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 802 may calculate a coefficient based on a user's actions. Social networking system 802 may monitor such actions on the online social network, on a third-party system 808, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 802 may calculate a coefficient based on the user's actions with particular types of content. The content may be associated with the online social network, a third-party system 808, or another suitable system. The content may include users, profile pages, posts, news stories, headlines, instant messages, chat room conversations, emails, advertisements, pictures, video, music, other suitable objects, or any combination thereof. Social networking system 802 may analyze a user's actions to determine whether one or more of the actions indicate an affinity for subject matter, content, other users, and so forth. As an example and not by way of limitation, if a user may make frequently posts content related to "coffee" or variants thereof, social networking system 802 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 802 may calculate a coefficient based on the type of relationship between particular objects. Referencing the social graph 900, social networking system 802 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than a user nodes 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 802 may determine that the user has a higher coefficient with respect to the first photo than the second photo because having a tagged-in-type relationship with content may be assigned a higher weight and/or rating than having a like-type relationship with content. In particular embodiments, social networking system 802 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 802 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social networking system 802 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 806 of the user). A first user may be more interested in other users or concepts that are closer to the first user. As an example and not by way of limitation, if a user is one mile from an airport and two miles from a gas station, social networking system 802 may determine that the user has a higher coefficient for the airport than the gas station based on the proximity of the airport to the user.

In particular embodiments, social networking system 802 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 802 may provide information that is relevant to user's interests and current circumstances, increasing the likelihood that they will find such information of interest. In particular embodiments, social networking system 802 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 802 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 802 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 808 (e.g., via an API or other communication channel), or from another suitable system. In response to the request, social networking system 802 may calculate the coefficient (or access the coefficient information if it has previously been calculated and stored). In particular embodiments, social networking system 802 may measure an affinity with respect to a particular process. Different processes (both internal and external to the online social network) may request a coefficient for a particular object or set of objects. Social networking system 802 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 904 corresponding to a particular photo may have a privacy setting specifying that the photo may only be accessed by users tagged in the photo and their friends. In particular embodiments, privacy settings may allow users to opt in or opt out of having their actions logged by social networking system 802 or shared with other systems (e.g., third-party system 808). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 808, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 802 may send a request to the data store for the object. The request may identify the user associated with the request and may only be sent to the user (or a client system 806 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
identifying, using one or more processors and for a social networking system user, a plurality of group memberships corresponding to a plurality of social networking groups in which the user has a membership, wherein each group comprises a plurality of posts;
analyzing, using the one or more processors, the plurality of posts from each of the plurality of groups in which the user has a membership to identify a plurality of user-to-user sale listings from each of the plurality of social networking groups in which the user has a membership;
aggregating, using the one or more processors, the identified plurality of user-to-user sale listings from each of the plurality of social networking groups in which the user has a membership into a personalized newsfeed for the social networking system user such that the personalized newsfeed comprises user-to-user sale listings from a subset of the plurality of social networking groups in which the user has a membership; and
providing, using the one or more processors, the personalized newsfeed to the social networking system user.

2. The method as recited in claim 1, wherein identifying the plurality of group memberships corresponding to the plurality of social networking groups in which the user has a membership comprises analyzing social networking system profile information associated with the social networking system user to identify the plurality of group memberships.

3. The method as recited in claim 1, wherein analyzing the plurality of posts to identify a plurality of user-to-user sale listings from each of the plurality of social networking groups in which the user has a membership comprises analyzing information specific to each of the plurality of posts from each of the plurality of social networking groups in which the user has a membership to determine whether each of the plurality of posts comprises one or more of a digital photograph featuring an item, a digital video featuring an item, a description including transactional language, or a description including sale-related acronyms.

4. The method as recited in claim 3, wherein analyzing the plurality of posts to identify a plurality of user-to-user sale listings from each of the plurality of social networking groups in which the user has a membership further comprises analyzing social networking system activity associated with each of the plurality of posts by identifying social networking system activity associated with each of the plurality of posts, and analyzing the identified social networking system activity for sale listing indicators.

5. The method as recited in claim 4, wherein identifying social networking system activity associated with each of the plurality of posts comprises identifying one or more of views of each of the plurality of posts, clicks associated with each of the plurality of posts, "likes" associated with each of the plurality of posts, one or more comments associated with each of the plurality of posts, or one or more messages associated with each of the plurality of posts.

6. The method as recited in claim 4, wherein analyzing the identified social networking system activity for sale listing indicators comprises analyzing the identified social networking system activity for one or more of time spent on views of each of the plurality of posts, a social networking system relationship between an author of each of the plurality of posts and a social networking system user who performed the social networking system activity, a social networking system relationship between two or more social networking system users who performed the social networking system activity, a time period that elapsed between each of the plurality of posts becoming active and the social networking system activity, a time period that elapsed between each of the plurality of posts becoming active and a removal of each of the plurality of posts, transactional language in one or more comments associated with each of the plurality of posts, or transactional language in one or more messages associated with each of the plurality of posts.

7. The method as recited in claim 1, further comprising reordering the personalized newsfeed based on social networking system activity associated with the user by:
   identifying social networking system activity associated with the user that indicates one or more interests associated with the user;
   determining, based on the identified social networking system activity, one or more of the plurality of user-to-user sale listings that will be interesting to the user; and
   reordering the personalized newsfeed such that the one or more of the plurality of user-to-user sale listings that will be interesting to the user are prominently positioned within the personalized newsfeed.

8. The method as recited in claim 7, wherein reordering the personalized newsfeed is further based on one or more of post information specific to each of the user-to-user sale listings or social networking system activity associated with each of the user-to-user sale listings from each of the subset of the plurality of social networking groups in which the user has a membership.

9. The method as recited in claim 8, wherein reordering the personalized newsfeed based on one or more of post information specific to each of the user-to-user sale listings or social networking system activity associated with each of the user-to-user sale listings comprises:
   identifying post information specific to each of the user-to-user sale listings that is indicative of a popularity level of each of the user-to-user sale listings;
   identifying social networking system activity associated with each of the user-to-user sale listings that is indicative of the popularity of each of the user-to-user sale listings; and
   reordering the personalized newsfeed such that one or more user-to-user sale listings associated with post information and social networking system activity that are indicative of the one or more user-to-user sale listings being popular are prominently positioned within the personalized newsfeed.

10. A system comprising:
   at least one processor; and
   at least one non-transitory computer-readable storage medium storing instructions thereon that, when executed by the at least one processor, cause the system to:
   identify, for a social networking system user, a plurality of group memberships corresponding to a plurality of social networking groups in which the user has a membership, wherein each group comprises a plurality of posts;
   analyze the plurality of posts from each of the plurality of groups in which the user has a membership to identify a plurality of user-to-user sale listings from each of the plurality of social networking groups in which the user has a membership;
   aggregate the identified plurality of user-to-user sale listings from each of the plurality of social networking groups in which the user has a membership into a personalized newsfeed for the social networking system user such that the personalized newsfeed comprises user-to-user sale listings from a subset of the plurality of social networking groups in which the user has a membership; and
   provide the personalized newsfeed to the social networking system user.

11. The system as recited in claim 10, wherein identifying the plurality of group memberships corresponding to the plurality of social networking groups in which the user has a membership comprises analyzing social networking system profile information associated with the social networking system user to identify the plurality of group memberships.

12. The system as recited in claim 11, wherein analyzing the plurality of posts to identify a plurality of user-to-user sale listings from each of the plurality of social networking groups in which the user has a membership comprises analyzing information specific to each of the plurality of posts from each of the plurality of social networking groups in which the user has a membership to determine whether each of the plurality of posts comprises one or more of a digital photograph featuring an item, a digital video featuring an item, a description including transactional language, or a description including sale-related acronyms.

13. The system as recited in claim 12, wherein analyzing the plurality of posts to identify a plurality of user-to-user sale listings from each of the plurality of social networking groups in which the user has a membership further comprises analyzing social networking system activity associated with each of the plurality of posts by identifying social networking system activity associated with each of the plurality of posts, and analyzing the identified social networking system activity for sale listing indicators.

14. The system as recited in claim 13, wherein identifying social networking system activity associated with each of the plurality of posts comprises identifying one or more of views of each of the plurality of posts, clicks associated with each of the plurality of posts, "likes" associated with each of the plurality of posts, one or more comments associated with each of the plurality of posts, or one or more messages associated with each of the plurality of posts.

15. The system as recited in claim 14, wherein analyzing the identified social networking system activity for sale listing indicators comprises analyzing the identified social networking system activity for one or more of time spent on views of each of the plurality of posts, a social networking system relationship between an author of each of the plurality of posts and a social networking system user who performed the social networking system activity, a social networking system relationship between two or more social networking system users who performed the social networking system activity, a time period that elapsed between each of the plurality of posts becoming active and the social networking system activity, a time period that elapsed between each of the plurality of posts becoming active and a removal of each of the plurality of posts, transactional language in one or more comments associated with each of the plurality of posts, or transactional language in one or more messages associated with each of the plurality of posts.

16. The system as recited in claim 15, further comprising instructions that cause the system to reorder the personalized newsfeed based on social networking system activity associated with the user by:
   identifying social networking system activity associated with the user that indicates one or more interests associated with the user;
   determining, based on the identified social networking system activity, one or more of the plurality of user-to-user sale listings that will be interesting to the user; and reordering the personalized newsfeed such that the one or more of the plurality of user-to-user sale listings that will be interesting to the user are prominently positioned within the personalized newsfeed.

17. The system as recited in claim 16, wherein reordering the personalized newsfeed is further based on one or more of post information specific to each of the user-to-user sale listings or social networking system activity associated with each of the user-to-user sale listings from each of the subset of the plurality of social networking groups in which the user has a membership.

18. The system as recited in claim 17, wherein reordering the personalized newsfeed based on one or more of post information specific to each of the user-to-user sale listings or social networking system activity associated with each of the user-to-user sale listings comprises:
   identifying post information specific to each of the user-to-user sale listings that is indicative of a popularity level of each of the user-to-user sale listings;
   identifying social networking system activity associated with each of the user-to-user sale listings that is indicative of the popularity of each of the user-to-user sale listings; and
   reordering the personalized newsfeed such that one or more user-to-user sale listings associated with post information and social networking system activity that are indicative of the one or more user-to-user sale listings being popular are prominently positioned within the personalized newsfeed.

19. A non-transitory computer readable medium storing instructions thereon that, when executed by at least one processor, cause a computer system to:
   identify, for a social networking system user, a plurality of group memberships corresponding to a plurality of social networking groups, wherein each group comprises a plurality of posts;
   analyze the plurality of posts from each of the plurality of groups in which the user has a membership to identify a plurality of user-to-user sale listings from each of the plurality of social networking groups in which the user has a membership;
   aggregate the identified plurality of user-to-user sale listings from each of the plurality of social networking groups in which the user has a membership into a personalized newsfeed for the social networking system user such that the personalized newsfeed comprises user-to-user sale listings from a subset of the plurality of social networking groups in which the user has a membership; and
   provide the personalized newsfeed to the social networking system user.

20. The non-transitory computer readable medium as recited in claim 19, further storing instructions that, when executed by the at least one processor, cause the computer system to reorder the personalized newsfeed based on one or more of social networking system activity associated with the user, post information specific to each of the user-to-user sale listings, or social networking system activity associated with each of the user-to-user sale listings.

* * * * *